United States Patent
Chen et al.

(10) Patent No.: US 11,871,377 B2
(45) Date of Patent: ***Jan. 9, 2024

(54) COMMUNICATION METHOD AND APPARATUS FOR INFORMATION TRANSMISSION IN A MONITORING OCCASION FOR A BEAM

(71) Applicant: Huawei Technologies Co., Ltd., Shenzhen (CN)

(72) Inventors: Lei Chen, Beijing (CN); Bingzhao Li, Beijing (CN); Li Chai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

This patent is subject to a terminal disclaimer.

(21) Appl. No.: 17/453,947

(22) Filed: Nov. 8, 2021

(65) Prior Publication Data

US 2022/0061022 A1    Feb. 24, 2022

Related U.S. Application Data

(63) Continuation of application No. 16/580,699, filed on Sep. 24, 2019, now Pat. No. 11,172,465, which is a
(Continued)

(30) Foreign Application Priority Data

Jun. 21, 2018   (CN) .......................... 201810646206.X

(51) Int. Cl.
*H04W 68/00*       (2009.01)
*H04W 68/02*       (2009.01)
(Continued)

(52) U.S. Cl.
CPC .......... *H04W 68/02* (2013.01); *H04B 7/0617* (2013.01); *H04B 10/07* (2013.01);
(Continued)

(58) Field of Classification Search
CPC . H04W 72/232; H04W 84/027; H04W 68/02; H04W 52/14; H04W 68/00; H04B 10/07
See application file for complete search history.

(56) References Cited

U.S. PATENT DOCUMENTS 7,473,911 B2     1/2009  Kadyshevitch et al.
11,172,465 B2 *  11/2021  Chen ..................... H04W 48/12
(Continued)

FOREIGN PATENT DOCUMENTS

CN       103259728 A     8/2013
CN       103906244 A     7/2014
(Continued)

OTHER PUBLICATIONS

"3GPP TS 38.331 v.15.0.0", Dec. 2017 (Year: 2017).*
(Continued)

*Primary Examiner* — Salvador E Rivas
(74) *Attorney, Agent, or Firm* — Slater Matsil, LLP

(57) ABSTRACT

A method includes: determining, by a communications device, information about a target beam; determining a target monitoring occasion based on the information about the target beam and a mapping relationship between information about a beam and a monitoring occasion, where the target monitoring occasion is in a system information window, and the system information window is used for OSI; and monitoring downlink control information in the target monitoring occasion. This application is applicable to a process of information transmission between a network device and the communications device.

26 Claims, 10 Drawing Sheets

Related U.S. Application Data continuation of application No. PCT/CN2019/088738, filed on May 28, 2019.

(51) Int. Cl.
| | |
|---|---|
| *H04W 52/02* | (2009.01) |
| *H04W 16/28* | (2009.01) |
| *H04B 7/06* | (2006.01) |
| *H04W 72/23* | (2023.01) |
| *H04B 10/07* | (2013.01) |
| *H04W 52/14* | (2009.01) |
| *H04W 84/02* | (2009.01) |
| *H04W 72/232* | (2023.01) |
| *H04B 7/185* | (2006.01) |

(52) U.S. Cl.
CPC ....... *H04W 16/28* (2013.01); *H04W 52/0229* (2013.01); *H04W 52/14* (2013.01); *H04W 68/00* (2013.01); *H04W 72/23* (2023.01); *H04W 72/232* (2023.01); *H04W 84/027* (2013.01); *H04B 7/1855* (2013.01)

(56) References Cited

U.S. PATENT DOCUMENTS

| | | | |
|---|---|---|---|
| 2015/0365814 | A1 | 12/2015 | Ayach et al. |
| 2018/0077680 | A1 | 3/2018 | Tenny et al. |
| 2018/0124773 | A1* | 5/2018 | Lee ......... H04W 72/23 |
| 2019/0013897 | A1 | 1/2019 | Chen et al. |
| 2019/0021076 | A1 | 1/2019 | Zhang et al. |
| 2019/0098615 | A1 | 3/2019 | Wang et al. |
| 2019/0149275 | A1 | 5/2019 | He et al. |
| 2019/0182682 | A1 | 6/2019 | Kim et al. |
| 2019/0222370 | A1 | 7/2019 | Zhang et al. |
| 2020/0404617 | A1* | 12/2020 | Murray ......... H04W 16/28 |
| 2021/0092584 | A1* | 3/2021 | Zou ........... H04W 4/029 |
| 2021/0112590 | A1* | 4/2021 | Kim ............ H04W 74/008 |
| 2021/0337502 | A1* | 10/2021 | Phan ........... H04W 74/008 |

FOREIGN PATENT DOCUMENTS

| | | |
|---|---|---|
| CN | 106664574 A | 5/2017 |
| CN | 106792792 A | 5/2017 |
| CN | 106793124 A | 5/2017 |
| CN | 106921468 A | 7/2017 |
| CN | 106961713 A | 7/2017 |
| CN | 107223347 A | 9/2017 |
| CN | 107425948 A | 12/2017 |
| CN | 107872834 A | 4/2018 |
| CN | 107888466 A | 4/2018 |
| CN | 107896121 A | 4/2018 |
| CN | 107948987 A | 4/2018 |
| CN | 108012273 A | 5/2018 |
| CN | 108012329 A | 5/2018 |
| JP | 2011100585 A | 5/2011 |
| JP | 2020519104 A | 6/2020 |
| KR | 20160056496 A | 5/2016 |
| WO | 2006111975 A1 | 10/2006 |
| WO | 2018016800 A1 | 1/2018 |
| WO | 2018030824 A1 | 2/2018 |
| WO | 2018078126 A1 | 5/2018 |

OTHER PUBLICATIONS

Campos, Javier, "Understanding the 5G NR Physical Layer", 2017 (Year: 2017).*

Nokia et al., "On Remaining Details on Other System Information Delivery," 3GPP TSG RAN WG1 #93, R1-1807173, Busan, Korea, Apr. 21-25, 2018, 3 pages.

Samsung, "CR to TS 38.213 capturing the RAN1#92bis and RAN1#93 meeting agreements and aligning higher layer parameters with TS 38.331," 3GPP TSG-RAN1 Meeting #93 R1-1807957, Busan, Korea, May 21-25, 2018, 106 pages.

3rd Generation Partnership Project; Technical Specification Group Radio Access Network; NR; NR and NG-RAN Overall Description; Stage 2 (Release 15), 3GPP TS 38.300 V15.2.0 (Jun. 2018), 4 pages.

3GPP TS 38.211 V15.1.0 (Mar. 2018); 3rd Generation Partnership Project; Technical Specification Group Radio Access Network; NR; Physical channels and modulation (Release 15); 90 pages.

3rd Generation Partnership Project; Technical Specification Group Radio Access Network; NR; Physical layer procedures for control (Release 15), 3GPP TS 38.213 V15.2.0 (Jun. 2018), 99 pages.

3rd Generation Partnership Project; Technical Specification Group Radio Access Network; NA; NA and NG-RAN Overall Description; Stage 2 (Release 15), 3GPP TS 38.300 V15.2.0 (Jun. 2018), 87 pages.

3GPP TS 38.304 V15.0.0 (Jun. 2018); 3rd Generation Partnership Project; Technical Specification Group Radio Access Network; NR; User Equipment (UE) procedures in Idle mode and RRC Inactive state (Release 15); 25 pages.

3rd Generation Partnership Project; Technical Specification Group Radio Access Network NR; Radio Resource Control (RRC) protocol specification (Release 15), TS 38.331 V15.0.0 (Dec. 2017), 188 pages.

3GPP TS 38.331, V15.2.0 (Jun. 2018); 3rd Generation Partnership Project; Technical Specification Group Radio Access Network; NR; Radio Resource Control (RRC) protocol specification (Release 15); 304 pages.

Campos, J., "Understanding the 5G NR Physical Layer," Keysight Technologies, Nov. 1, 2017, 111 pages.

Huawei, et al., "Offline summary for A1 7.1.1.3 on Paging", 3GPP TSG RAN WG1 Meeting #92bis, R1-1805679, Sanya, China, Apr. 16-20, 2018, 7 pages.

Huawei et al., "Considerations on System Information Scheduling", 3GPP TSG-RAN2 Meeting #102, R2-1808197, Busan, Korea, May 21-25, 2018, 2 pages.

Huawei et al., "Considerations on the mapping between PDCCH occasion and beam for OSI", 3GPP TSG RAN WG2 Meeting #AH-1807, R2-1810126, Montreal, Canada, Jul. 2-6, 2018, 2 pages.

Qualcomm, Inc., "Tagging and indication of DL beams", 3GPP TSG-RAN WG1 #90, R1-1713400, Prague, P.R. Czechia, Aug. 21-25, 2017, 9 pages.

3GPP TS 38.133 V15.1.0 (Mar. 2018), "3rd Generation Partnership Project; Technical Specification Group Radio Access Network; NR; Requirements for support of radio resource management (Release 15)," 59 pages.

3GPP TS 38.215 V15.1.0 (Mar. 2018), "3rd Generation Partnership Project; Technical Specification Group Radio Access Network; NR; Physical layer measurements (Release 15)," 15 pages.

* cited by examiner

COMMUNICATION METHOD AND APPARATUS FOR INFORMATION TRANSMISSION IN A MONITORING OCCASION FOR A BEAM

CROSS-REFERENCE TO RELATED APPLICATIONS

This application is a continuation of U.S. patent application Ser. No. 16/580,699, filed on Sep. 24, 2019, now U.S. Pat. No. 11,172,465, which is a continuation of International Application No. PCT/CN2019/088738, filed on May 28, 2019. The International Application claims priority to Chinese Patent Application No. 201810646206.X, filed on Jun. 21, 2018. All of the afore-mentioned patent applications are hereby incorporated by reference in their entireties.

TECHNICAL FIELD

This application relates to the field communications technologies, and in particular, to an information transmission method and an apparatus.

BACKGROUND

Compared with a long term evolution (LTE) system, a new radio access technology (NR) system operates at a higher spectrum. Because of fast attenuation and a large path loss in a high-frequency signal transmission process, the NR system uses a beamforming technology to obtain a beam with good directionality, so as to improve power in a transmit direction so that attenuation of a high-frequency signal in the transmission process can be resisted.

Currently, when the NR system uses the beamforming technology, a network device sends downlink control information to a communications device in a beam sweeping manner. The downlink control information is used to indicate time-frequency information of a physical downlink shared channel (PDSCH) for carrying other system information (OSI) or paging information. The communications device monitors, in all monitoring occasions, whether the network device sends the downlink control information. However, because of a limited coverage area of a beam, in some monitoring occasions, a beam sent by the network device cannot cover the communications device. Therefore, it is definitely ineffective for the communications device to monitor, in these monitoring occasions, whether the network device sends the downlink control information, but instead, power of the communications device is wasted.

SUMMARY

This application provides an information transmission method and an apparatus, to resolve a problem of power waste caused when a communications device blindly monitors downlink control information in all monitoring occasions.

To achieve the foregoing objective, this application provides the following technical solutions.

According to a first aspect, an information transmission method is provided, including: determining, by a network device based on information about a beam and a mapping relationship between a beam and a monitoring occasion, a monitoring occasion corresponding to the beam, where the monitoring occasion is in a system information window, and the system information window is used for OSI; and sending downlink control information by using the beam in the monitoring occasion corresponding to the beam. In this way, a communications device within a coverage area of a specific beam needs to monitor only a monitoring occasion corresponding to the beam to receive downlink control information, without a need to monitor the downlink control information in each monitoring occasion in the system information window, thereby reducing a quantity of times of monitoring the downlink control information by the communications device, improving efficiency in monitoring the downlink control information by the communications device, and helping reduce power consumption of the communications device.

In a possible design, the mapping relationship between a beam and a monitoring occasion includes: a difference between an index of the beam and a number of the monitoring occasion is equal to a preset value. In this way, the network device can determine, based on the index of the beam, the number of the monitoring occasion corresponding to the beam.

In a possible design, the mapping relationship between a beam and a monitoring occasion includes: a beam whose index is i corresponds to m monitoring occasions whose numbers are from i*m to (i+1)*m−1, where m=floor(M/N), floor( ) represents rounding down, M represents a total quantity of monitoring occasions included in the system information window, and N represents a total quantity of beams actually sent by a cell. This ensures that each beam in a cell corresponds to one or more monitoring occasions in the system information window.

In a possible design, the mapping relationship between a beam and a monitoring occasion is expressed by the following formula: mod(Occasion index, N)=i, where Occasion index represents a number of a monitoring occasion in the system information window, N represents a total quantity of beams actually sent by a cell, and i represents an index of a beam. This ensures that each beam in a cell corresponds to one or more monitoring occasions in the system information window.

Optionally, a rule for numbering monitoring occasions is: the monitoring occasions in the system information window are sequentially numbered from 0 starting from the $1^{st}$ monitoring occasion in the system information window. This ensures that each monitoring occasion in the system information window has a unique number.

Optionally, the monitoring occasion is a first monitoring occasion; or the monitoring occasion is a second monitoring occasion, and the second monitoring occasion is a first monitoring occasion meeting a preset condition. It should be noted that, when the monitoring occasion is the second monitoring occasion, a conflict between the monitoring occasion and an uplink symbol, between the monitoring occasion and a flexible symbol, or between the monitoring occasion and an SSB can be avoided, and it is ensured that the network device can normally send the downlink control information in the monitoring occasion, thereby ensuring that the communications device can normally obtain the OSI.

In a possible design, the preset condition includes at least one of or any combination of the following: all symbols in the first monitoring occasion are downlink symbols; all symbols in the first monitoring occasion are flexible symbols; all symbols in the first monitoring occasion are flexible symbols or downlink symbols; a quantity of downlink symbols in the first monitoring occasion is greater than a preset quantity; a quantity of flexible symbols in the first monitoring occasion is greater than a preset quantity; a total quantity of downlink symbols and flexible symbols in the first monitoring occasion is greater than a preset quantity; flexible symbols in the first monitoring occasion are set to be changed to downlink symbols during sending of the downlink control information; or no synchronization signal block (SSB) is carried in the first monitoring occasion.

According to a second aspect, an information transmission method is provided, including: determining, by a communications device, information about a target beam; determining a target monitoring occasion based on the information about the target beam and a mapping relationship between a beam and a monitoring occasion, where the target monitoring occasion is in a system information window, and the system information window is used for other system information OSI; and monitoring downlink control information in the target monitoring occasion. In this way, the communications device does not need to monitor the downlink control information in each monitoring occasion in the system information window, thereby reducing a quantity of times of monitoring the downlink control information by the communications device, improving efficiency in monitoring the downlink control information by the communications device, and helping reduce power consumption of the communications device.

In a possible design, the mapping relationship between a beam and a monitoring occasion includes: a difference between an index of the beam and a number of the monitoring occasion is equal to a preset value. In this way, the communications device can determine, based on the index of the beam, the number of the monitoring occasion corresponding to the beam.

In a possible design, the mapping relationship between a beam and a monitoring occasion includes: a beam whose index is i corresponds to m monitoring occasions whose numbers are from i*m to (i+1)*m−1, where m=floor(M/N), floor( ) represents rounding down, M represents a total quantity of monitoring occasions included in the system information window, and N represents a total quantity of beams actually sent by a cell. This ensures that each beam in a cell corresponds to one or more monitoring occasions in the system information window.

In a possible design, the mapping relationship between a beam and a monitoring occasion may be expressed by the following formula: mod(Occasion index, N)=i, where Occasion index represents a number of a monitoring occasion in the system information window, N represents a total quantity of beams actually sent by a cell, and i represents an index of a beam. This ensures that each beam in a cell corresponds to one or more monitoring occasions in the system information window.

Optionally, a rule for numbering monitoring occasions is: the monitoring occasions in the system information window are sequentially numbered from 0 starting from the $1^{st}$ monitoring occasion in the system information window. This ensures that each monitoring occasion in the system information window has a unique number.

Optionally, the monitoring occasion is a first monitoring occasion; or the monitoring occasion is a second monitoring occasion, and the second monitoring occasion is a first monitoring occasion meeting a preset condition. It should be noted that, when the monitoring occasion is the second monitoring occasion, a conflict between the monitoring occasion and an uplink symbol, between the monitoring occasion and a flexible symbol, or between the monitoring occasion and an SSB can be avoided, and it is ensured that the network device can normally send the downlink control information in the monitoring occasion, thereby ensuring that the communications device can normally obtain the OSI.

In a possible design, the preset condition includes at least one of or any combination of the following: all symbols in the first monitoring occasion are downlink symbols; all symbols in the first monitoring occasion are flexible symbols; all symbols in the first monitoring occasion are flexible symbols or downlink symbols; a quantity of downlink symbols in the first monitoring occasion is greater than a preset quantity; a quantity of flexible symbols in the first monitoring occasion is greater than a preset quantity; a total quantity of downlink symbols and flexible symbols in the first monitoring occasion is greater than a preset quantity; flexible symbols in the first monitoring occasion are set to be changed to downlink symbols during sending of the downlink control information; or no SSB is carried in the first monitoring occasion.

According to a third aspect, an information transmission method is provided, including: determining, by a network device, a paging occasion corresponding to a communications device, where the paging occasion includes a plurality of monitoring occasions, and the monitoring occasion meets a preset condition; determining, based on information about a beam and a mapping relationship between a beam and a monitoring occasion, a monitoring occasion corresponding to the beam; and sending downlink control information by using the beam in the monitoring occasion corresponding to the beam. Based on the foregoing technical solution, because the monitoring occasion included in the paging occasion meets the preset condition, the monitoring occasion included in the paging occasion does not conflict with an uplink symbol, a flexible symbol, or an SSB. This ensures that the network device can normally send the downlink control information in the monitoring occasion included in the paging occasion, thereby ensuring that the communications device can normally obtain paging information.

In a possible design, the preset condition includes at least one of or any combination of the following: all symbols in the monitoring occasion are downlink symbols; all symbols in the monitoring occasion are flexible symbols; all symbols in the monitoring occasion are flexible symbols or downlink symbols; a quantity of downlink symbols in the monitoring occasion is greater than a preset quantity; a quantity of flexible symbols in the monitoring occasion is greater than a preset quantity; a total quantity of downlink symbols and flexible symbols in the monitoring occasion is greater than a preset quantity; flexible symbols in the monitoring occasion are set to be changed to downlink symbols during sending of the downlink control information; or no SSB is carried in the monitoring occasion.

In a possible design, the determining, by a network device, a paging occasion corresponding to a communications device includes: determining, according to a formula i_s=floor (UE_ID/N) mod $N_s$, a number of the paging occasion corresponding to the communications device, where i_s represents the number of the paging occasion, floor( ) represents rounding down, UE_ID represents an identifier of the communications device, N=min(T, nB), $N_s$=max(1,nB/T), T represents a paging cycle of the communications device, nB is a preset constant, and a value set of nB is {4T, 2T, T, T/2, T/4, T/8, T/16}.

It should be noted that a paging occasion whose number is 0 includes M monitoring occasions whose numbers are from 0 to M−1, a paging occasion whose number is 1 includes M monitoring occasions whose numbers are from M to 2M−1, a paging occasion whose number is 2 includes M monitoring occasions whose numbers are from 2M to 3M−1, and a paging occasion whose number is 3 includes M monitoring occasions whose numbers are from 3M to 4M−1, where M represents a total quantity of beams actually sent by a cell.

Optionally, a rule for numbering monitoring occasions is: the monitoring occasions are sequentially numbered from 0 starting from the 1$^{st}$ monitoring occasion after a start boundary of a paging frame corresponding to the communications device. This ensures that a monitoring occasion after the start boundary of the paging frame has a unique number.

According to a fourth aspect, an information transmission method is provided, including: determining, by a communications device, a paging occasion corresponding to the communications device, where the paging occasion includes a plurality of monitoring occasions, and the monitoring occasion meets a preset condition; determining information about a target beam; determining a target monitoring occasion based on the information about the target beam and a mapping relationship between a beam and a monitoring occasion; and monitoring downlink control information in the target monitoring occasion. Based on the foregoing technical solution, because the monitoring occasion included in the paging occasion meets the preset condition, the monitoring occasion does not conflict with an uplink symbol, a flexible symbol, or an SSB. Therefore, the communications device can receive the downlink control information in the target monitoring occasion, thereby ensuring that the communications device can normally obtain paging information. In addition, because the communications device monitors the downlink control information only in the target monitoring occasion, without a need to monitor the downlink control information in each monitoring occasion included in the paging occasion, thereby reducing a quantity of times of monitoring by the communications device, improving monitoring efficiency, and reducing power consumption of the communications device.

In a possible design, the preset condition includes at least one of or any combination of the following: all symbols in the monitoring occasion are downlink symbols; all symbols in the monitoring occasion are flexible symbols; all symbols in the monitoring occasion are flexible symbols or downlink symbols; a quantity of downlink symbols in the monitoring occasion is greater than a preset quantity; a quantity of flexible symbols in the monitoring occasion is greater than a preset quantity; a total quantity of downlink symbols and flexible symbols in the monitoring occasion is greater than a preset quantity; flexible symbols in the monitoring occasion are set to be changed to downlink symbols during sending of the downlink control information; or no SSB is carried in the monitoring occasion.

In a possible design, the determining, by a communications device, a paging occasion corresponding to the communications device includes: determining, by the communications device according to a formula $i\_s = \text{floor}(UE\_ID/N) \mod N_s$, a number of the paging occasion corresponding to the communications device, where $i\_s$ represents the number of the paging occasion, floor( ) represents rounding down, UE_ID represents an identifier of the communications device, $N = \min(T, nB)$, $N_s = \max(1, nB/T)$, T represents a paging cycle of the communications device, nB is a preset constant, and a value set of nB is $\{4T, 2T, T, T/2, T/4, T/8, T/16\}$.

It should be noted that a paging occasion whose number is 0 includes M monitoring occasions whose numbers are from 0 to M−1, a paging occasion whose number is 1 includes M monitoring occasions whose numbers are from M to 2M−1, a paging occasion whose number is 2 includes M monitoring occasions whose numbers are from 2M to 3M−1, and a paging occasion whose number is 3 includes M monitoring occasions whose numbers are from 3M to 4M−1, where M represents a total quantity of beams actually sent by a cell.

Optionally, a rule for numbering monitoring occasions is: the monitoring occasions are sequentially numbered from 0 starting from the 1$^{st}$ monitoring occasion after a start boundary of a paging frame corresponding to the communications device. This ensures that a monitoring occasion after the start boundary of the paging frame has a unique number.

According to a fifth aspect, a network device is provided, including: a processing module and a sending module. The processing module is configured to determine, based on information about a beam and a mapping relationship between a beam and a monitoring occasion, a monitoring occasion corresponding to the beam, where the monitoring occasion is in a system information window, and the system information window is used for OSI. The sending module is configured to send downlink control information by using the beam in the monitoring occasion corresponding to the beam.

In a possible design, the mapping relationship between a beam and a monitoring occasion includes: a difference between an index of the beam and a number of the monitoring occasion is equal to a preset value.

In a possible design, the mapping relationship between a beam and a monitoring occasion includes: a beam whose index is i corresponds to m monitoring occasions whose numbers are from i*m to (i+1)*m−1, where m=floor(M/N), floor( ) represents rounding down, M represents a total quantity of monitoring occasions included in the system information window, and N represents a total quantity of beams actually sent by a cell.

In a possible design, the mapping relationship between a beam and a monitoring occasion is expressed by the following formula: mod(Occasion index, N)=i, where Occasion index represents a number of a monitoring occasion in the system information window, N represents a total quantity of beams actually sent by a cell, and i represents an index of a beam.

Optionally, a rule for numbering monitoring occasions is: the monitoring occasions in the system information window are sequentially numbered from 0 starting from the 1$^{st}$ monitoring occasion in the system information window.

Optionally, the monitoring occasion is a first monitoring occasion; or the monitoring occasion is a second monitoring occasion, and the second monitoring occasion is a first monitoring occasion meeting a preset condition.

In a possible design, the preset condition includes at least one of or any combination of the following: all symbols in the first monitoring occasion are downlink symbols; all symbols in the first monitoring occasion are flexible symbols; all symbols in the first monitoring occasion are flexible symbols or downlink symbols; a quantity of downlink symbols in the first monitoring occasion is greater than a preset quantity; a quantity of flexible symbols in the first monitoring occasion is greater than a preset quantity; a total quantity of downlink symbols and flexible symbols in the first monitoring occasion is greater than a preset quantity; flexible symbols in the first monitoring occasion are set to be changed to downlink symbols during sending of the downlink control information; or no SSB is carried in the first monitoring occasion.

According to a sixth aspect, a network device is provided, including: a processing module and a sending module. The processing module is configured to determine a paging occasion corresponding to a communications device, where the paging occasion includes a plurality of monitoring occasions, and the monitoring occasion meets a preset condition. The processing module is further configured to determine, based on information about a beam and a mapping relationship between a beam and a monitoring occasion, a monitoring occasion corresponding to the beam. The sending module is configured to send downlink control information by using the beam in the monitoring occasion corresponding to the beam.

In a possible design, the preset condition includes at least one of or any combination of the following: all symbols in the monitoring occasion are downlink symbols; all symbols in the monitoring occasion are flexible symbols; all symbols in the monitoring occasion are flexible symbols or downlink symbols; a quantity of downlink symbols in the monitoring occasion is greater than a preset quantity; a quantity of flexible symbols in the monitoring occasion is greater than a preset quantity; a total quantity of downlink symbols and flexible symbols in the monitoring occasion is greater than a preset quantity; flexible symbols in the monitoring occasion are set to be changed to downlink symbols during sending of the downlink control information; or no SSB is carried in the monitoring occasion.

In a possible design, the processing module is configured to determine, according to a formula $i\_s = \text{floor}(UE\_ID/N) \mod N_s$, a number of the paging occasion corresponding to the communications device, where is represents the number of the paging occasion, floor( ) represents rounding down, UE_ID represents an identifier of the communications device, $N = \min(T, nB)$, $N_s = \max(1, nB/T)$, T represents a paging cycle of the communications device, nB is a preset constant, and a value set of nB is $\{4T, 2T, T, T/2, T/4, T/8, T/16\}$.

It should be noted that a paging occasion whose number is 0 includes M monitoring occasions whose numbers are from 0 to M−1, a paging occasion whose number is 1 includes M monitoring occasions whose numbers are from M to 2M−1, a paging occasion whose number is 2 includes M monitoring occasions whose numbers are from 2M to 3M−1, and a paging occasion whose number is 3 includes M monitoring occasions whose numbers are from 3M to 4M−1, where M represents a total quantity of beams actually sent by a cell.

Optionally, a rule for numbering monitoring occasions is: the monitoring occasions are sequentially numbered from 0 starting from the $1^{st}$ monitoring occasion after a start boundary of a paging frame corresponding to the communications device.

According to a seventh aspect, a network device is provided, including: a processor and a memory. The memory is configured to store a computer executable instruction, and when the network device runs, the processor executes the computer executable instruction stored in the memory, so that the network device performs the information transmission method according to any one of the possible designs of the first aspect or the third aspect.

According to an eighth aspect, a computer-readable storage medium is provided, where the computer-readable storage medium stores an instruction, and when the instruction runs on a computer, the computer is enabled to perform the information transmission method according to any one of the possible designs of the first aspect or the third aspect.

According to a ninth aspect, a computer program product including an instruction is provided, and when the instruction runs on a computer, the computer is enabled to perform the information transmission method according to any one of the possible designs of the first aspect or the third aspect.

According to a tenth aspect, a chip system is provided, where the chip system includes a processor, configured to support a network device in implementing functions of the information transmission method according to any one of the possible designs of the first aspect or the third aspect. In a possible design, the chip system further includes a memory, where the memory is configured to store a program instruction and data that are necessary for the network device. The chip system may include a chip, or may include a chip and another discrete device.

For technical effects brought by any design in the fifth aspect to the tenth aspect, refer to the technical effects brought by different designs in the first aspect or the third aspect. Details are not described herein again.

According to an eleventh aspect, a communications device is provided, including: a processing module, configured to determine information about a target beam, where the processing module is further configured to determine a target monitoring occasion based on the information about the target beam and a mapping relationship between a beam and a monitoring occasion, where the target monitoring occasion is in a system information window, and the system information window is used for OSI; and a receiving module, configured to monitor downlink control information in the target monitoring occasion.

In a possible design, the mapping relationship between a beam and a monitoring occasion includes: a difference between an index of the beam and a number of the monitoring occasion is equal to a preset value.

In a possible design, the mapping relationship between a beam and a monitoring occasion includes: a beam whose index is i corresponds to m monitoring occasions whose numbers are from $i*m$ to $(i+1)*m-1$, where $m = \text{floor}(M/N)$, floor( ) represents rounding down, M represents a total quantity of monitoring occasions included in the system information window, and N represents a total quantity of beams actually sent by a cell.

In a possible design, the mapping relationship between a beam and a monitoring occasion is expressed by the following formula: $\mod(\text{Occasion index}, N) = i$, where Occasion index represents a number of a monitoring occasion in the system information window, N represents a total quantity of beams actually sent by a cell, and i represents an index of a beam.

Optionally, a rule for numbering monitoring occasions is: the monitoring occasions in the system information window are sequentially numbered from 0 starting from the $1^{st}$ monitoring occasion in the system information window.

Optionally, the monitoring occasion is a first monitoring occasion; or the monitoring occasion is a second monitoring occasion, and the second monitoring occasion is a first monitoring occasion meeting a preset condition.

In a possible design, the preset condition includes at least one of or any combination of the following: all symbols in the first monitoring occasion are downlink symbols; all symbols in the first monitoring occasion are flexible symbols; all symbols in the first monitoring occasion are flexible symbols or downlink symbols; a quantity of downlink symbols in the first monitoring occasion is greater than a preset quantity; a quantity of flexible symbols in the first monitoring occasion is greater than a preset quantity; a total quantity of downlink symbols and flexible symbols in the first monitoring occasion is greater than a preset quantity; flexible symbols in the first monitoring occasion are set to be changed to downlink symbols during sending of the downlink control information; or no SSB is carried in the first monitoring occasion.

According to a twelfth aspect, a communications device is provided, including: a processing module and a receiving module. The processing module is configured to determine a paging occasion corresponding to the communications device, where the paging occasion includes a plurality of monitoring occasions, and the monitoring occasion meets a preset condition. The processing module is further configured to determine information about a target beam; and determine a target monitoring occasion based on the information about the target beam and a mapping relationship between a beam and a monitoring occasion. The receiving module is configured to monitor downlink control information in the target monitoring occasion.

In a possible design, the preset condition includes at least one of or any combination of the following: all symbols in the monitoring occasion are downlink symbols; all symbols in the monitoring occasion are flexible symbols; all symbols in the monitoring occasion are flexible symbols or downlink symbols; a quantity of downlink symbols in the monitoring occasion is greater than a preset quantity; a quantity of flexible symbols in the monitoring occasion is greater than a preset quantity; a total quantity of downlink symbols and flexible symbols in the monitoring occasion is greater than a preset quantity; flexible symbols in the monitoring occasion are set to be changed to downlink symbols during sending of the downlink control information; or no SSB is carried in the monitoring occasion.

In a possible design, the processing module is configured to determine, according to a formula $i\_s=\text{floor}(UE\_ID/N) \mod N_s$, a number of the paging occasion corresponding to the communications device, where is represents the number of the paging occasion, floor( ) represents rounding down, UE_ID represents an identifier of the communications device, $N=\min(T, nB)$, $N_s=\max(1, nB/T)$, T represents a paging cycle of the communications device, nB is a preset constant, and a value set of nB is {4T, 2T, T, T/2, T/4, T/8, T/16}.

It should be noted that a paging occasion whose number is 0 includes M monitoring occasions whose numbers are from 0 to M−1, a paging occasion whose number is 1 includes M monitoring occasions whose numbers are from M to 2M−1, a paging occasion whose number is 2 includes M monitoring occasions whose numbers are from 2M to 3M−1, and a paging occasion whose number is 3 includes M monitoring occasions whose numbers are from 3M to 4M−1, where M represents a total quantity of beams actually sent by a cell.

Optionally, a rule for numbering monitoring occasions is: the monitoring occasions are sequentially numbered from 0 starting from the $1^{st}$ monitoring occasion after a start boundary of a paging frame corresponding to the communications device.

According to a thirteenth aspect, a communications device is provided, including: a processor and a memory. The memory is configured to store a computer executable instruction, and when the communications device runs, the processor executes the computer executable instruction stored in the memory, so that the communications device performs the information transmission method according to any one of the possible designs of the second aspect or the fourth aspect.

According to a fourteenth aspect, a computer-readable storage medium is provided, where the computer-readable storage medium stores an instruction, and when the instruction runs on a computer, the computer is enabled to perform the information transmission method according to any one of the possible designs of the second aspect or the fourth aspect.

According to a fifteenth aspect, a computer program product including an instruction is provided, and when the instruction runs on a computer, the computer is enabled to perform the information transmission method according to any one of the possible designs of the second aspect or the fourth aspect.

According to a sixteenth aspect, a chip system is provided, where the chip system includes a processor, configured to support a communications device in implementing functions of the information transmission method according to any one of the possible designs of the second aspect or the fourth aspect. In a possible design, the chip system further includes a memory, where the memory is configured to store a program instruction and data that are necessary for the communications device. The chip system may include a chip, or may include a chip and another discrete device.

For technical effects brought by any design in the eleventh aspect to the sixteenth aspect, refer to the technical effects brought by different designs in the second aspect or the fourth aspect. Details are not described herein again.

DETAILED DESCRIPTION OF ILLUSTRATIVE EMBODIMENTS

Figure 1:
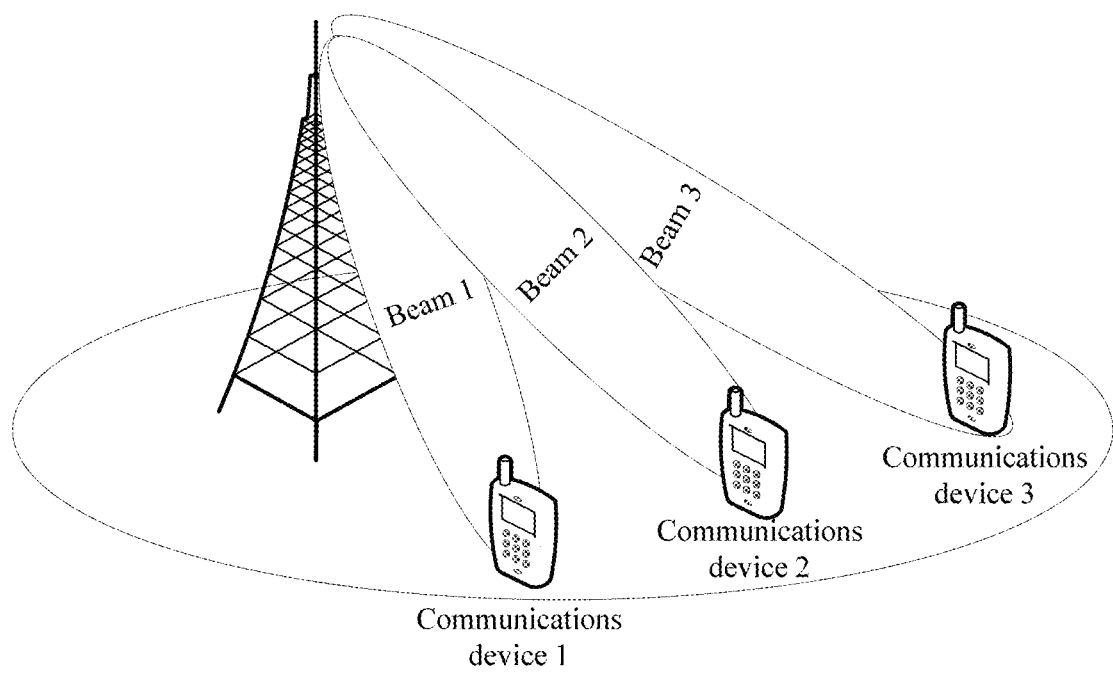
FIG. 1 is a schematic diagram of beam sweeping.

The terms "first", "second", and the like in this application are intended to distinguish between different objects and do not limit an order thereof. For example, the first monitoring occasion and the second monitoring occasion are merely intended to distinguish between different monitoring occasions and do not limit an order thereof.

The term "and/or" in this application describes only an association relationship for describing associated objects and indicates that three relationships may exist. For example, A and/or B may represent the following three cases: Only A exists, both A and B exist, and only B exists. In addition, the character "/" in this application generally indicates an "or" relationship between the associated objects.

It should be noted that, in this application, the word "exemplary" or "for example" is used to represent giving an example, an illustration, or a description. Any embodiment or design scheme described as an "exemplary" or "for example" in this application should not be explained as being more preferred or having more advantages than another embodiment or design scheme. Exactly, use of the word "exemplary" or "example" or the like is intended to present a related concept in a specific manner.

In addition, the network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that, with the evolution of the network architecture and the emergence of new service scenarios, the technical solutions provided in the embodiments of this application are also applicable to similar technical problems.

Before describing the method provided in the embodiments of this application, the following first briefly describes some concepts.

1. Radio Frame

Currently, in an NR communications system, a length of each radio frame is 10 ms, one radio frame includes a plurality of slots, and one slot includes 14 orthogonal frequency division multiplexing (OFDM) symbols. When a subcarrier spacing (SCS) is 15 kHz, a time-domain length of a slot is 1 ms.

A transmission direction of an OFDM symbol in a slot may be uplink, downlink, or flexible. That a transmission direction of an OFDM symbol is downlink means that a network device sends information to a communications device. That a transmission direction of an OFDM symbol is uplink means that the communications device sends information to the network device. That a transmission direction of an OFDM symbol is flexible means that the transmission direction of the OFDM symbol may be uplink or may be downlink.

A combination of transmission directions of symbols in a slot may be understood as a format of the slot. A current standard specifies slot formats, some of which are shown in Table 1. In Table 1, D indicates that a transmission direction of a symbol is downlink, U indicates that a transmission direction of a symbol is uplink, and X indicates that a transmission direction of a symbol is flexible.

TABLE 1

| Slot format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |

TABLE 1-continued

| Slot format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| ... | | | | | | | | | | | | | | |
| 27 | D | D | D | X | X | X | X | X | X | X | X | U | U | U |
| ... | | | | | | | | | | | | | | |

2. Beam

A beam is a communication resource, and may be understood as a signal strength distribution formed in different spatial directions after a signal is transmitted by using an antenna. A beam may be used to transmit data channel information, control channel information, a sounding signal, and the like. The network device may send same information or different information by using different beams.

After a beamforming technology is used, the network device needs to use a plurality of beams with different directionality to fully cover a cell. Therefore, the network device usually sends downlink information in a beam sweeping manner, that is, the network device sends downlink information to the communications device by using beams with different directionality.

For example, the beam sweeping manner is described with reference to FIG. 1, and the network device covers a cell by using a beam 1, a beam 2, and a beam 3. In a process of sending downlink information, the network device first sends downlink information by using the beam 1, then the network device sends downlink information by using the beam 2, and finally the network device sends downlink information by using the beam 3. In this way, the communications device can receive the downlink information sent by the network device regardless of a location of the communications device within a coverage area of a cell.

3. System Information

The system information includes minimum system information (MSI) and OSI.

The MSI includes a master information block (MIB) and a system information block 1 (SIB1). The MIB includes important parameters such as a system frame number. The SIB1 includes parameters, such as a camping threshold, used by the communications device to determine whether a cell is available.

The OSI includes one or more system information blocks other than the SIB1. For example, the OSI may include a SIB2, a SIB3, and the like.

4. Common Search Space (CSS)

The common search space is a time-frequency resource. The common search space is used to transmit a physical downlink control channel (PDCCH), and the PDCCH carries a paging message or downlink control information of OSI. The communications device needs to blindly detect a common search space in a monitoring occasion of the common search space, to obtain downlink control information.

In a current standard, the monitoring occasion of the common search space is configured by using the following parameters:

(1) Cycle $k_{p,s}$, which is measured in slots.

(2) Quantity $n_s$ of consecutive to-be-measured slots in one cycle, where the to-be-measured slot is a slot including a monitoring occasion.

(3) Offset slot $o_{p,s}$.

(4) Sounding symbol bit information in a slot, which is represented by a 14-bit bitmap (bitmap) and used to indicate a location of the $1^{st}$ symbol in a monitoring occasion included in the slot.

(5) Sounding duration, which is a quantity of consecutive symbols included in a monitoring occasion.

(6) The $1^{st}$ to-be-measured slot in a radio frame is determined by using a formula $$(n_f * N_{slot}^{frame,\mu} + n_{s,f}^{\mu} - o_{p,s}) \bmod k_{p,s} = 0. \; N_{slot}^{frame,\mu}$$

is a quantity of slots in a radio frame, $n_f$ represents a quantity of radio frames, and $n_{s,f}^{\mu}$ represents a number of the $1^{st}$ to-be-measured slot in a radio frame.

Figure 2:
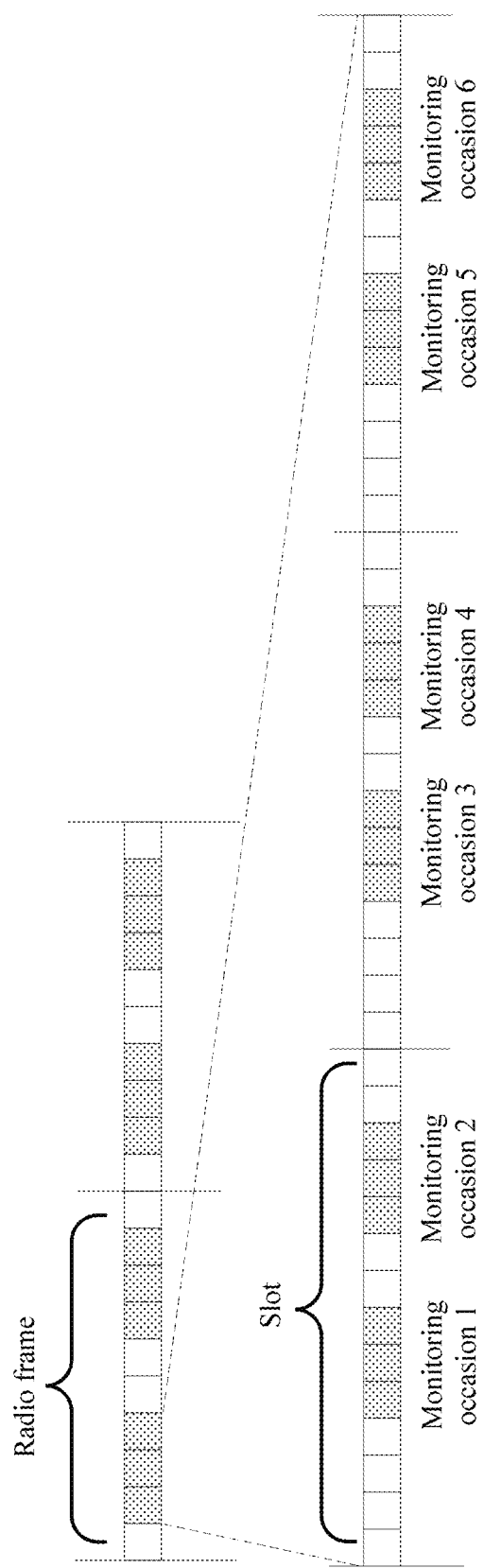
FIG. 2 is a schematic diagram of a monitoring occasion in a common search space.

For example, if $k_{p,s}=5$, $o_{p,s}=1$, bit map= [00001000010000], the sounding duration is three symbols, $N_{slot}^{frame,\mu}=10$, $n_f=2$, and $n_s=3$, a monitoring occasion included in a common search space may be shown in FIG. 2.

5. System Information Window (SI-Window)

The system information window is used for OSI. It should be noted that downlink control information of each OSI is transmitted only in a system information window corresponding to the OSI; and in each system information window, only downlink control information of corresponding OSI can be transmitted and downlink control information of other OSI cannot be transmitted.

The system information window is determined based on the following parameters: a start frame and a start slot of the system information window, a length of the system information window, a cycle of the system information window, and a sequence number of OSI in an OSI list.

The length of the system information window is a quantity of slots included in the system information window. The OSI list is used to indicate to-be-sent OSI, pieces of OSI in the OSI list are sequentially numbered from 1. For the network device, the cycle of the system information window, the length of the system information window, and the OSI list all are preset. For a communications device, the cycle of the system information window, the length of the system information window, and the OSI list are determined by using a received SIB1. Specifically, the length of the system information window is specified by an si-Window-Length field of the SIB1 received by the communications device. The OSI list is specified by a schedulingInfoList field of the SIB1. The cycle of the system information window is specified by an si-Periodicity field of the SIB1.

The start frame of the system information window is determined according to a formula SFN mod(T)=flood(x/d). SFN is a system frame number of the start frame of the system information window, T represents the cycle of the system information window, d represents a quantity of slots in a radio frame, d is usually 10, and x=(n−1)*w, where w represents the length of the system information window, and n represents a sequence number of OSI in an OSI list.

A start slot in the start frame of the system information window is determined according to a formula a=x mod(d), where a represents a number of the start slot.

An information transmission method provided in this application may be applied to various communications systems that use the beamforming technology, such as an NR communications system of a 5th generation (5G) communications technology, a future evolved system, or a system in which a plurality of communications are converged. The technical solutions provided in this application may be applied to a plurality of application scenarios such as a machine-to-machine (M2M) communication scenario, a macro-micro communication scenario, an enhanced mobile broadband (eMBB) scenario, an ultra-reliable and low latency communications (uRLLC) scenario, and a massive machine type communications (mMTC) scenario. These scenarios may include but are not limited to: a scenario of communication between communications devices, a scenario of communication between network devices, a scenario of communication between a network device and a communications device, and the like.

Figure 3:
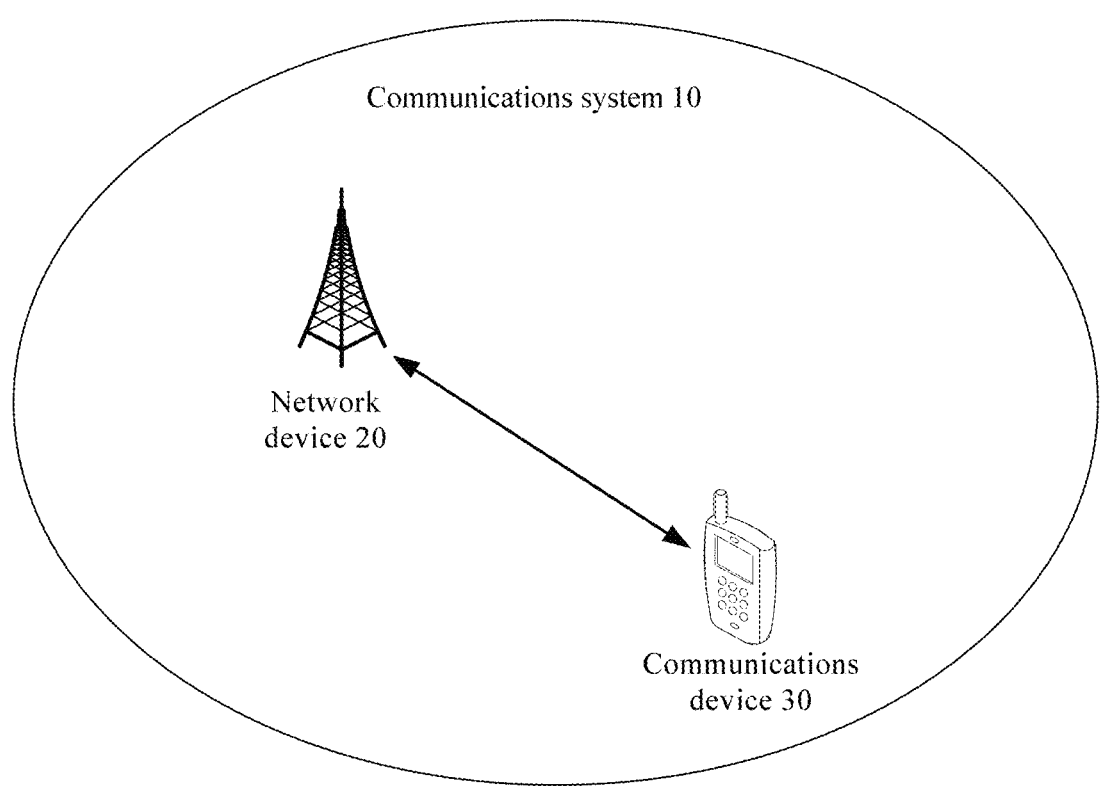
FIG. 3 is a schematic diagram of a communications system according to an embodiment of this application.

FIG. 3 provides a schematic diagram of a communications system applicable to the technical solutions provided in this application. The communications system 10 includes a network device 20 and a communications device 30.

The network device 20 may be a base station, a base station controller, or the like in wireless communications. For example, the base station may be a base transceiver station (BTS) in a global system for mobile communications (GSM) or a code division multiple access (CDMA) system, or may be a NodeB (NodeB) in a wideband code division multiple access (WCDMA) system, or may be an evolved NodeB (eNB, or e-NodeB) in an LTE system. Alternatively, the base station may be an eNB in an internet of things (IoT) or a narrowband internet of things (NB-IoT). This is not specifically limited in this embodiment of this application. Certainly, the network device 20 may be a device in another network, for example, may be a network device in a future 5G mobile communications network or a future evolved public land mobile network (PLMN).

The communications device 30 provides voice and/or data connectivity services for a user, and may be, for example, user equipment (UE), an access terminal, a terminal unit, a terminal station, a mobile station, a remote station, a remote terminal, a mobile device, a wireless communications device, a terminal agent, or a terminal apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a communications device in a future 5G network, a communications device in a future evolved public land mobile network (PLMN), or the like. This is not specifically limited in this embodiment of this application.

Figure 4:
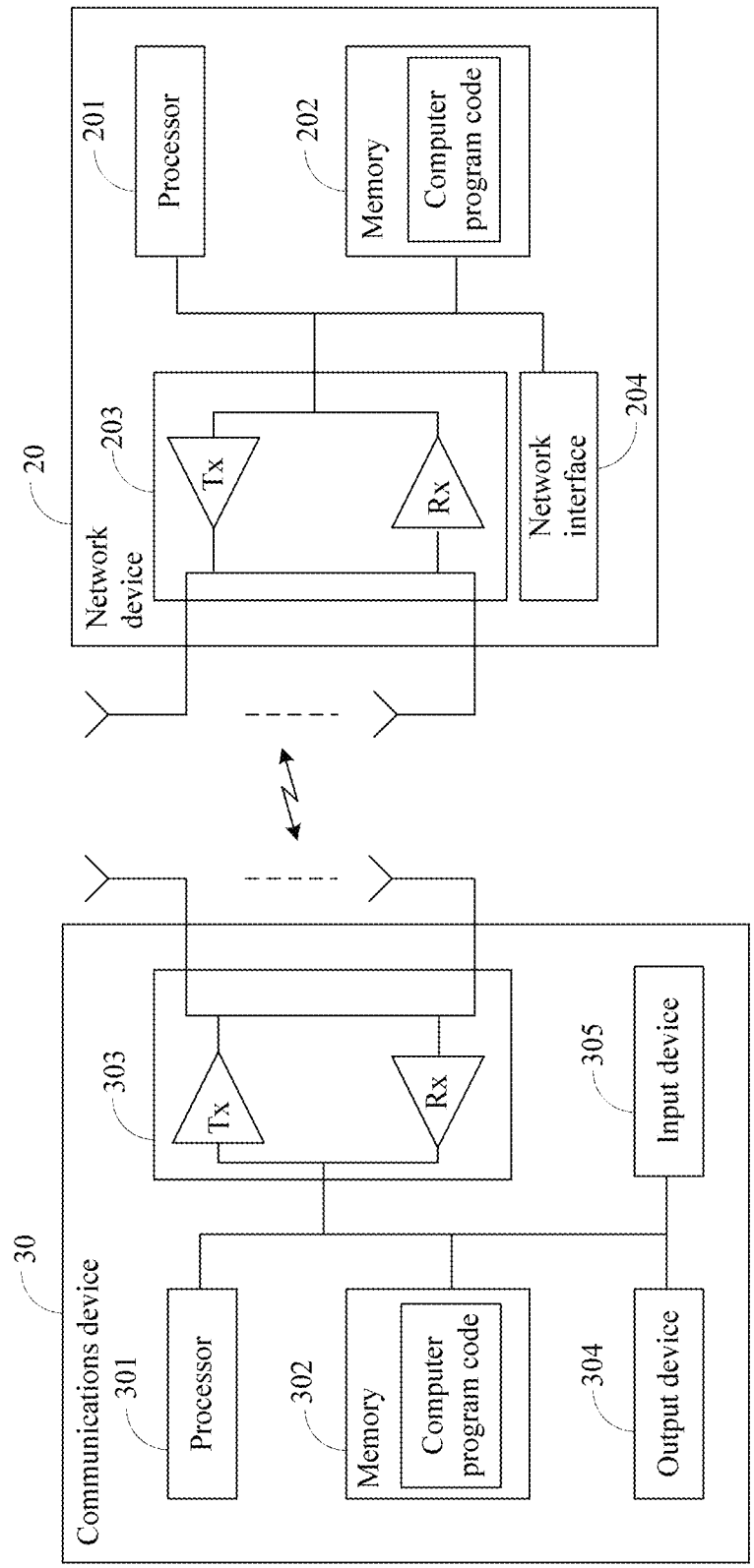
FIG. 4 is a schematic diagram of hardware structures of a network device and a communications device according to an embodiment of this application.

FIG. 4 is a schematic diagram of hardware structures of a network device 20 and a communications device 30 according to an embodiment of this application.

The communications device 30 includes at least one processor 301, at least one memory 302, and at least one transceiver 303. Optionally, the communications device 30 may further include an output device 304 and an input device 305.

The processor 301, the memory 302, and the transceiver 303 are connected by using a bus. The processor 301 may be a general-purpose central processing unit (CPU), a microprocessor, an application-specific integrated circuit (ASIC), or one or more integrated circuits configured to control program execution of the solutions of this application. The processor 301 may include a plurality of CPUs, and the processor 301 may be a single-core processor or a multi-core processor. The processor herein may be one or more devices, circuits, or processing cores configured to process data (such as a computer program instruction).

The memory 302 may be a read-only memory (ROM) or another type of static storage device capable of storing static information and an instruction, or a random access memory (RAM) or another type of dynamic storage device capable of storing information and an instruction; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), or a magnetic disk storage medium or another magnetic storage device, or any other medium that can carry or store expected program code having an instruction or data structure form and can be accessed by a computer; but is not limited thereto. The memory 302 may exist independently, and be connected to the processor 301 by using a bus. Alternatively, the memory 302 may be integrated with the processor 301. The memory 302 is configured to store application program code used to perform the solutions of this application, and the execution is controlled by the processor 301. The processor 301 is configured to execute computer program code stored in the memory 302, to implement the information transmission method in the embodiments of this application.

The transceiver 303 may use any apparatus such as a transceiver to communicate with another device or a communications network such as an Ethernet, a radio access network (RAN), or a wireless local area network (WLAN). The transceiver 303 includes a transmitter Tx and a receiver Rx.

The output device 304 communicates with the processor 301, and may display information in a plurality of manners. For example, the output device 304 may be a liquid crystal display (LCD), a light emitting diode (LED) display device, a cathode ray tube (CRT) display device, a projector, or the like. The input device 305 communicates with the processor 301, and may receive user input in a plurality of manners. For example, the input device 305 may be a mouse, a keyboard, a touchscreen device, a sensing device, or the like.

The network device 20 includes at least one processor 201, at least one memory 202, at least one transceiver 203, and at least one network interface 204. The processor 201, the memory 202, the transceiver 203, and the network interface 204 are connected by using a bus. The network interface 204 is configured to connect to a core network device by using a link (for example, an S1 interface), or connect to a network interface of another access network device (not shown in the figure) by using a wired or wireless link (for example, an X2 interface). This is not specifically limited in this embodiment of this application. In addition, for related descriptions of the processor 201, the memory 202, and the transceiver 203, refer to the descriptions of the processor 301, the memory 302, and the transceiver 303 in the communications device 30. Details are not described herein again.

Figure 5:
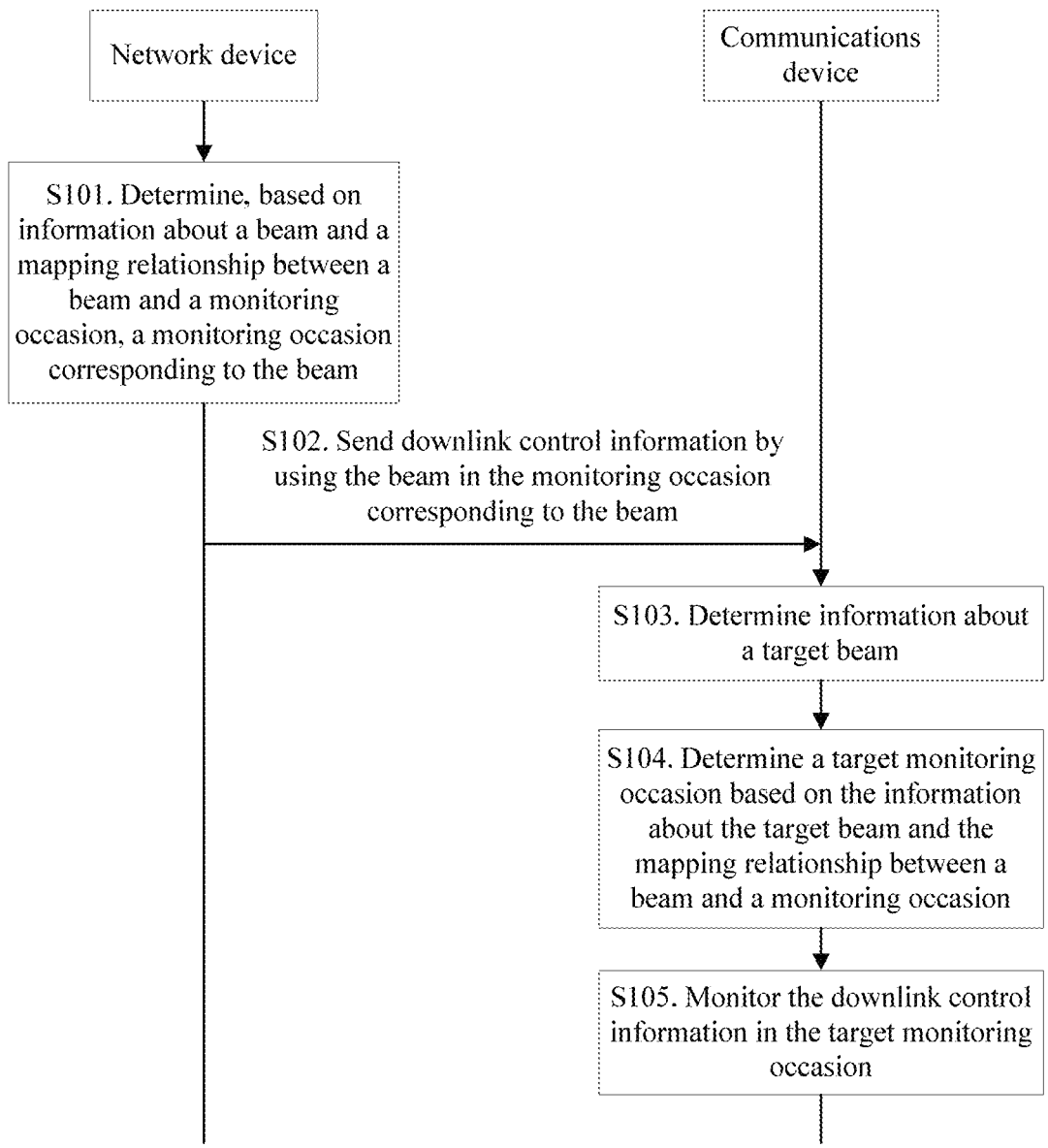
FIG. 5 is a flowchart of an information transmission method according to an embodiment of this application.

FIG. 5 shows an information transmission method according to an embodiment of this application. The method is applied to a scenario in which a network device sends downlink control information of OSI to a communications device. The method includes the following steps S101 to S105.

S101. The network device determines, based on information about a beam and a mapping relationship between a beam and a monitoring occasion, a monitoring occasion corresponding to the beam.

The beam is a beam actually sent by any cell. The information about the beam includes an index of the beam. Optionally, the index of the beam is an index of the SSB.

The monitoring occasion is in a system information window, and the system information window is used for OSI.

Optionally, a monitoring occasion included in the system information window is a first monitoring occasion.

However, the first monitoring occasion may conflict with an uplink symbol, a flexible symbol, or an SSB. For example, all symbols included in the first monitoring occasion are uplink symbols. When the first monitoring occasion conflicts with the uplink symbol, the flexible symbol, or the SSB, the network device cannot send downlink control information in the first monitoring occasion, and therefore the communications device cannot receive the downlink control information in the first monitoring occasion either. If the communications device still monitors the downlink control information in the first monitoring occasion, the communications device definitely cannot receive the downlink control information, but instead, power of the communications device is wasted.

Therefore, in order to prevent the communications device from monitoring the downlink control information in an ineffective first monitoring occasion and reduce power consumption of the communications device, in this embodiment of this application, a second monitoring occasion is a first monitoring occasion meeting a preset condition. The preset condition is that the first monitoring occasion does not conflict with the uplink symbol, the flexible symbol, or the SSB.

It should be noted that whether the monitoring occasion included in the system information window is specifically the first monitoring occasion or the second monitoring occasion is determined through negotiation between the network device and the communications device or is determined through presetting.

Optionally, the preset condition includes at least one of or any combination of the following:

(1) All symbols in the first monitoring occasion are downlink symbols.
(2) All symbols in the first monitoring occasion are flexible symbols.
(3) All symbols in the first monitoring occasion are flexible symbols or downlink symbols.
(4) A quantity of downlink symbols in the first monitoring occasion is greater than a preset quantity. It should be noted that the preset quantity is configured by a higher layer or is predefined. Optionally, the network device sends a notification message to the communications device, so that the communications device learns of a specific value of the preset quantity.
(5) A quantity of flexible symbols in the first monitoring occasion is greater than a preset quantity.
(6) A total quantity of downlink symbols and flexible symbols in the first monitoring occasion is greater than a preset quantity.
(7) Flexible symbols in the first monitoring occasion are set to be changed to downlink symbols during sending of the downlink control information. It should be noted that the network device sends a notification message to the communications device, so that the communications device learns whether the flexible symbols in the first monitoring occasion are set to be changed to downlink symbols during sending of the downlink control information.
(8) No SSB is carried in the first monitoring occasion. It should be noted that the SSB includes a primary synchronization signal, a secondary synchronization signal, and a physical broadcast channel, where the physical broadcast channel carries information such as the index of the SSB and a MIB. The SSB is sent in a beam sweeping manner, each beam for sending an SSB is an SSB beam, and the index of the SSB is an index of a corresponding beam. A beam for carrying a downlink common channel and the SSB beam have a quasi-colocation (quasi-colocation, QCL) relationship. In other words, a beam for carrying a downlink common channel also uses an index of the SSB beam.

The following describes cases of implementation of the foregoing preset conditions (1) to (8) with examples.

For example, if all symbols in the first monitoring occasion are downlink symbols but an SSB needs to be carried in the first monitoring occasion, the first monitoring occasion is not the second monitoring occasion.

For another example, if a quantity of flexible symbols in the first monitoring occasion is greater than a preset quantity but the flexible symbols in the first monitoring occasion are not set to be changed to downlink symbols during sending of the downlink control information, the first monitoring occasion is not the second monitoring occasion.

For another example, if a total quantity of downlink symbols and flexible symbols in the first monitoring occasion is greater than a preset quantity and the flexible symbols in the first monitoring occasion are set to be changed to downlink symbols during sending of the downlink control information, the first monitoring occasion is the second monitoring occasion.

In this embodiment of this application, the mapping relationship between a beam and a monitoring occasion is a one-to-one correspondence or a one-to-many correspondence between a beam and a monitoring occasion.

In addition, to ensure that each beam in a cell corresponds to one or more monitoring occasions in the system information window, a total quantity of monitoring occasions included in the system information window may be set to be greater than a total quantity of beams actually sent by the cell.

For example, the mapping relationship between a beam and a monitoring occasion is: a difference between an index of the beam and a number of the monitoring occasion is equal to a preset value. Optionally, the preset value includes an integer multiple of a total quantity of beams actually sent by a cell.

For another example, the mapping relationship between a beam and a monitoring occasion is: a beam whose index is i corresponds to m monitoring occasions whose numbers are from i*m to (i+1)*m−1, where m=floor(M/N), floor( ) represents rounding down, M represents a total quantity of monitoring occasions included in the system information window, and N represents a total quantity of beams actually sent by a cell.

Optionally, the mapping relationship between a beam and a monitoring occasion may be implemented in a form of a list or a formula. Certainly, the correspondence between a beam and a monitoring occasion may alternatively be implemented in another form, and this is not limited in this embodiment of this application.

For example, Table 2 shows an example of a mapping relationship between a beam and a monitoring occasion.

TABLE 2

| Index of a beam | Number of a monitoring occasion |
|---|---|
| 0 | 0, 1 |
| 1 | 2, 3 |

TABLE 2-continued

| Index of a beam | Number of a monitoring occasion |
|---|---|
| ... | ... |
| N − 1 | 2N − 2, 2N − 1 |

For example, the mapping relationship between a beam and a monitoring occasion may be expressed by the following formula: mod(Occasion index, N)=i, where Occasion index represents a number of a monitoring occasion in the system information window, N represents a total quantity of beams actually sent by a cell, and i represents an index of a beam.

It should be noted that a rule for numbering monitoring occasions in the system information window is: the monitoring occasions in the system information window are sequentially numbered from 0 starting from the $1^{st}$ monitoring occasion in the system information window.

Specifically, when the monitoring occasions included in the system information window are first monitoring occasions, the first monitoring occasions in the system information window are sequentially numbered from 0 starting from the $1^{st}$ first monitoring occasion in the system information window. When the monitoring occasions included in the system information window are second monitoring occasions, the second monitoring occasions in the system information window are sequentially numbered from 0 starting from the $1^{st}$ second monitoring occasion in the system information window.

For example, it is assumed that the system information window sequentially includes a monitoring occasion a, a monitoring occasion b, a monitoring occasion c, and a monitoring occasion d, where the monitoring occasion a and the monitoring occasion d are second monitoring occasions. When monitoring occasions included in the system information window are first monitoring occasions, the monitoring occasion a is numbered 0, the monitoring occasion b is numbered 1, the monitoring occasion c is numbered 2, and the monitoring occasion d is numbered 3. When monitoring occasions included in the system information window are second monitoring occasions, the monitoring occasion a is numbered 0, and the monitoring occasion d is numbered 1.

S102. The network device sends the downlink control information by using the beam in the monitoring occasion corresponding to the beam.

The downlink control information is used to indicate time-frequency information of a PDSCH for carrying the OSI. The downlink control information is carried in the PDCCH.

For example, description is given with reference to Table 2. The network device sends, by using a beam whose index is 0, the downlink control information in monitoring occasions numbered 0 and 1 in the system information window. The network device sends, by using a beam whose index is 1, the downlink control information in monitoring occasions numbered 2 and 3 in the system information window. By analogy, the network device sends, by using a beam whose index is N−1, the downlink control information in monitoring occasions numbered 2N−2 and 2N−1 in the system information window.

S103. The communications device determines information about a target beam.

The information about the target beam includes an index of the target beam.

The target beam is a beam, meeting a specific condition, in beams actually sent by a cell. For example, signal strength of the target beam is greater than a preset value, or in terms of signal strength rankings from high to low, signal strength of the target beam is ranked higher than a preset place.

It can be understood that, that signal strength of the target beam is greater than a preset value, or signal strength of the target beam is ranked higher than a preset place indicates that the communications device is within a coverage area of the target beam, and therefore the communications device can receive information delivered by the network device by using the target beam.

In an optional implementation, the communications device detects signal strength of beams, to determine the target beam and further determine the information about the target beam.

It should be noted that a quantity of target beams is not limited in this embodiment of this application, that is, the communications device may determine a plurality of different beams as the target beams.

S104. The communications device determines a target monitoring occasion based on the information about the target beam and the mapping relationship between a beam and a monitoring occasion.

The target monitoring occasion is in the system information window, and the target monitoring occasion corresponds to the target beam.

Step S104 is similar to step S101. For related description, refer to step S101. Details are not described herein again in this embodiment of this application.

S105. The communications device monitors the downlink control information in the target monitoring occasion.

Optionally, if a monitoring occasion included in the system information window is a first monitoring occasion, after determining a first monitoring occasion corresponding to the target beam, the communications device determines whether the first monitoring occasion corresponding to the target beam meets the preset condition (that is, determines whether the first monitoring occasion corresponding to the target beam is a second monitoring occasion). If the first monitoring occasion corresponding to the target beam meets the preset condition, the communications device monitors the downlink control information based on the first monitoring occasion. If the first monitoring occasion corresponding to the target beam does not meet the preset condition, the communications device does not monitor the downlink control information in the first monitoring occasion, to reduce power consumption of the communications device.

Optionally, if the monitoring occasion included in the system information window is the second monitoring occasion, the communications device monitors the downlink control information in the target monitoring occasion.

According to the information transmission method provided in this embodiment of this application, the communications device determines the target monitoring occasion based on the information about the target beam and the correspondence between a beam and a monitoring occasion, so that the communications device monitors the downlink control information only in the target monitoring occasion. In this way, the communications device does not need to monitor the downlink control information in each monitoring occasion in the system information window, thereby reducing a quantity of times of monitoring the downlink control information by the communications device, improving efficiency in monitoring the downlink control information by the communications device, and helping reduce power consumption of the communications device.

An action of the foregoing step S101 may be performed by invoking, by the processor 201 in the network device shown in FIG. 4, application program code stored in the memory 202. An action of the foregoing step S102 may be performed by a communications interface 204 in the network device shown in FIG. 4. Actions of the foregoing steps S103 and S104 may be performed by invoking, by the processor 301 in the communications device shown in FIG. 4, the application program code stored in the memory 302. An action of the foregoing step S105 may be performed by a communications interface 303 in the communications device shown in FIG. 4. This is not limited in this embodiment of this application.

Currently, the communications device monitors downlink control information in a monitoring occasion included in a paging occasion, so that the communications device obtains paging information based on the downlink control information. However, a monitoring occasion defined by the current standard may conflict with an uplink symbol, a flexible symbol, or an SSB. For example, all symbols included in the monitoring occasion are uplink symbols. In this case, consequently the network device cannot send the downlink control information in the monitoring occasion, and further, the communications device cannot obtain the paging information, affecting normal use of the communications device.

Figure 6:
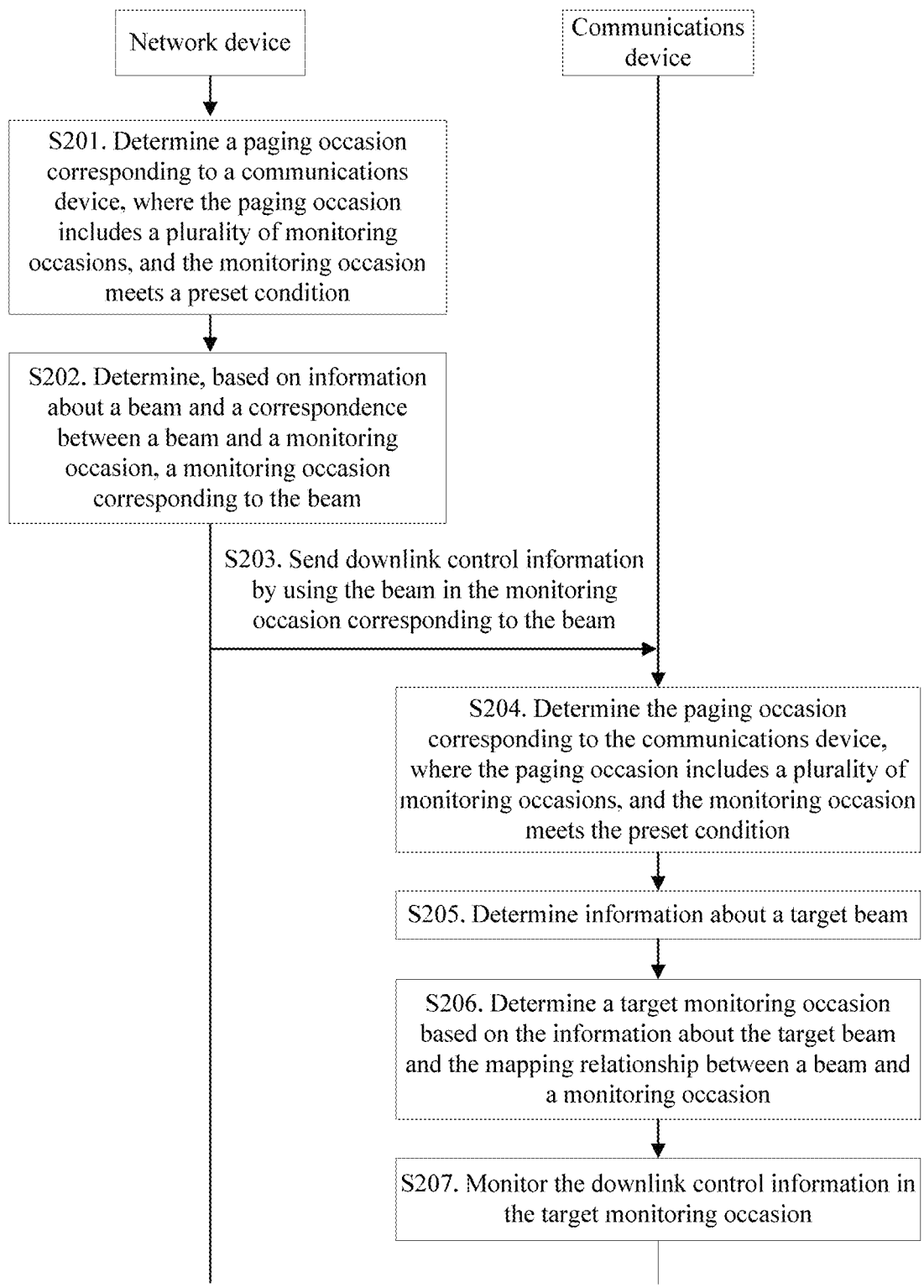
FIG. 6 is a flowchart of another information transmission method according to an embodiment of this application.

To ensure that the network device can normally send the downlink control information in the monitoring occasion included in the paging occasion and accordingly ensure that the communications device can normally obtain the paging information, an embodiment of this application provides an information transmission method. As shown in FIG. 6, the method includes the following steps S201 to S207.

S201. The network device determines a paging occasion corresponding to the communications device.

The paging occasion includes a plurality of monitoring occasions, and the monitoring occasion meets a preset condition. The preset condition is that the monitoring occasion does not conflict with an uplink symbol, a flexible symbol, or an SSB.

Optionally, the preset condition includes at least one of or any combination of the following:
 (1) All symbols in the monitoring occasion are downlink symbols.
 (2) All symbols in the monitoring occasion are flexible symbols.
 (3) All symbols in the monitoring occasion are flexible symbols or downlink symbols.
 (4) A quantity of downlink symbols in the monitoring occasion is greater than a preset quantity. It should be noted that the preset quantity is configured by a higher layer or is predefined. Optionally, the network device sends a notification message to the communications device, so that the communications device learns of a specific value of the preset quantity.
 (5) A quantity of flexible symbols in the monitoring occasion is greater than a preset quantity.
 (6) A total quantity of downlink symbols and flexible symbols in the monitoring occasion is greater than a preset quantity.
 (7) Flexible symbols in the monitoring occasion are set to be changed to downlink symbols during sending of the downlink control information. It should be noted that the network device sends a notification message to the communications device, so that the communications device learns whether the flexible symbols in the first monitoring occasion are set to be changed to downlink symbols during sending of the downlink control information.
 (8) No SSB is carried in the monitoring occasion.

It should be noted that the paging occasion corresponding to the communications device is determined based on a system frame number of a paging frame and a number of the paging occasion.

The system frame number of the paging frame is determined according to a formula mod(SFN+offset,T)=(T div N)*mod(UE_ID, N). SFN is the system frame number of the paging frame, offset represents an offset value of the system frame number, T represents a paging cycle of the communications device, and UE_ID represents an identifier of the communications device. In actual application, UE_ID=mod (IMSI, 1024), international mobile subscriber identity (International Mobile Subscriber Identity Number, IMSI) is a flag for identifying a mobile user, div represents exact division, N=min(T, nB), nB is a preset constant, and a value set of nB is {4T, 2T, T, T/2, T/4, T/8, T/16}.

The number of the paging occasion is determined according to a formula i_s=floor (UE_ID/N) mod $N_s$, where i_s represents the number of the paging occasion, floor( ) represents rounding down, and $N_s$=max(1,nB/T). It should be noted that a value set of i_s is {0, 1, 2, 3}.

It should be noted that a paging occasion whose number is 0 includes M monitoring occasions whose numbers are from 0 to M−1, a paging occasion whose number is 1 includes M monitoring occasions whose numbers are from M to 2M−1, a paging occasion whose number is 2 includes M monitoring occasions whose numbers are from 2M to 3M−1, and a paging occasion whose number is 3 includes M monitoring occasions whose numbers are from 3M to 4M−1, where M represents a total quantity of beams actually sent by a cell.

Optionally, a rule for numbering monitoring occasions is: the monitoring occasions are sequentially numbered from 0 starting from the $1^{st}$ monitoring occasion after a start boundary of a paging frame corresponding to the communications device.

S202. The network device determines, based on information about a beam and a mapping relationship between a beam and a monitoring occasion, a monitoring occasion corresponding to the beam.

The information about the beam includes an index of the beam. The beam is a beam actually sent by any cell.

In this embodiment of this application, the mapping relationship between a beam and a monitoring occasion is a one-to-one correspondence between a beam and a monitoring occasion.

For example, the mapping relationship between a beam and a monitoring occasion is: a difference between an index of the beam and a number of the monitoring occasion is equal to a preset value. Optionally, the preset value includes an integer multiple of a total quantity of beams actually sent by a cell.

Optionally, the mapping relationship between a beam and a monitoring occasion may be implemented in a form of a list or a formula. Certainly, the correspondence between a beam and a monitoring occasion may alternatively be implemented in another form, and this is not limited in this embodiment of this application.

For example, Table 3 shows an example of a mapping relationship between a beam and a monitoring occasion.

TABLE 3

| Index of a beam | Number of a monitoring occasion |
|---|---|
| 0 | 0 |
| 1 | 1 |
| ... | ... |
| N − 1 | N − 1 |

For example, the mapping relationship between a beam and a monitoring occasion may be expressed by the following formula: mod(Occasion index, N)=i, where Occasion index represents a number of a monitoring occasion in a system information window, N represents a total quantity of beams actually sent by a cell, and i represents an index of a beam.

S203. The network device sends the downlink control information by using the beam in the monitoring occasion corresponding to the beam.

The downlink control information is carried in a PDCCH. The downlink control information is used to indicate time-frequency information of a PDSCH for carrying paging information.

For example, description is given with reference to Table 3. The network device sends, by using a beam whose index is 0, the downlink control information in a monitoring occasion numbered 0. The network device sends, by using a beam whose index is 1, the downlink control information in a monitoring occasion numbered 1. By analogy, the network device sends, by using a beam whose index is N−1, the downlink control information in a monitoring occasion numbered N−1.

S204. The communications device determines the paging occasion corresponding to the communications device.

Step S201 is similar to step S204. For related description, refer to step S204. Details are not described herein again in this embodiment of this application.

S205. The communications device determines information about a target beam.

The information about the target beam includes an index of the target beam.

The target beam is a beam, meeting a specific condition, in beams actually sent by a cell. For example, signal strength of the target beam is greater than a preset value, or in terms of signal strength rankings of beams from high to low, signal strength of the target beam is ranked higher than a preset place.

It can be understood that, that signal strength of the target beam is greater than a preset value, or signal strength of the target beam is ranked higher than a preset place indicates that the communications device is within a coverage area of the target beam, and therefore the communications device can receive information delivered by the network device by using the target beam.

In an optional implementation, the communications device detects signal strength of beams, to determine the target beam and further determine the information about the target beam.

It should be noted that a quantity of target beams is not limited in this embodiment of this application, that is, the communications device may determine a plurality of different beams as the target beams.

S206. The communications device determines a target monitoring occasion based on the information about the target beam and the mapping relationship between a beam and a monitoring occasion.

The target monitoring occasion corresponds to the target beam.

Step S206 is similar to step S202. For related description, refer to step S202. Details are not described herein again in this embodiment of this application.

S207. The communications device monitors the downlink control information in the target monitoring occasion.

For example, description is given with reference to Table 3. If the communications device determines that the index of the target beam is 0, the communications device monitors the downlink control information in the monitoring occasion numbered 0. If the communications device determines that the index of the target beam is 1, the communications device monitors the downlink control information in the monitoring occasion numbered 1. By analogy, if the communications device determines that the index of the target beam is N−1, the communications device monitors the downlink control information in the monitoring occasion numbered N−1.

According to the information transmission method provided in this embodiment of this application, the network device determines the paging occasion corresponding to the communications device, where the paging occasion includes a plurality of monitoring occasions, and these monitoring occasions meet the preset condition, thereby ensuring that the monitoring occasion does not conflict with an uplink symbol, a flexible symbol, or an SSB. This ensures that the network device can normally send the downlink control information in the monitoring occasion included in the paging occasion, thereby ensuring that the communications device can normally obtain the paging information.

Actions of the foregoing steps S201 and S202 may be performed by invoking, by the processor 201 in the network device shown in FIG. 4, application program code stored in the memory 202. An action of the foregoing step S203 may be performed by a communications interface 203 in the network device shown in FIG. 4. Actions of the foregoing steps S204 to S206 may be performed by invoking, by the processor 301 in the communications device shown in FIG. 4, the application program code stored in the memory 302. An action of the foregoing step S207 may be performed by a communications interface 303 in the communications device shown in FIG. 4. This is not limited in this embodiment of this application.

The solutions provided in the embodiments of this application are mainly described above from a perspective of interaction between the communications device and the network device. It may be understood that, to implement the foregoing functions, the communications device and the network device include a corresponding hardware structure and/or software module for performing the functions. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications device and the network device each may be divided based on the foregoing method examples, for example, may be divided into modules or units based on the corresponding functions, or two or more functions may be integrated into one processing module. The foregoing integrated module may be implemented in a form of hardware, or may be implemented in a form of a software module or unit. In this embodiment of this application, module or unit division is used as an example, and is merely logical function division. In actual implementation, another division manner may be used.

Figure 7:
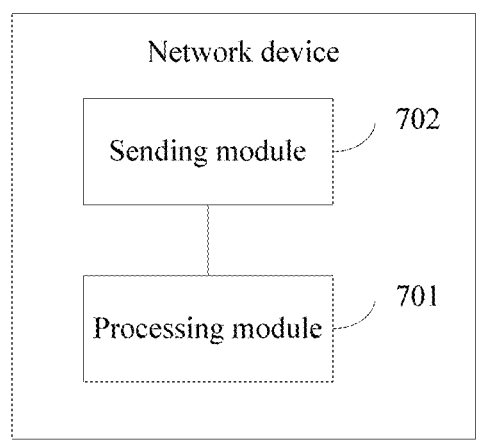
FIG. 7 is a schematic structural diagram 1 of a network device according to an embodiment of this application.

For example, when function modules are divided based on the functions, FIG. 7 is a possible schematic structural diagram of the network device in the foregoing embodiments. As shown in FIG. 7, the network device includes a processing module 701 and a sending module 702. The processing module 701 is configured to support the network device in performing step S101 in FIG. 5, steps S201 and S202 in FIG. 6, and/or other processes of technologies described in this specification. The sending module 702 is configured to support the network device in performing step S102 in FIG. 5, step S203 in FIG. 6, and/or other processes of technologies described in this specification.

In this embodiment of this application, the apparatus is presented by division of the function modules based on the functions, or the apparatus is presented by division of the function modules in an integrated manner. The "module" herein may include an application-specific integrated circuit (ASIC), a circuit, a processor and memory for executing one or more software or firmware programs, an integrated logic circuit, or another device capable of providing the foregoing functions. In a simple embodiment, a person skilled in the art may figure out that the network device may use the network device shown in FIG. 4 for implementation. For example, the sending module 702 in FIG. 7 may be implemented by a communications interface 203 in FIG. 4, and the processing module 701 may be implemented by the processor 201 in FIG. 4. This is not limited in this embodiment of this application.

Figure 8:
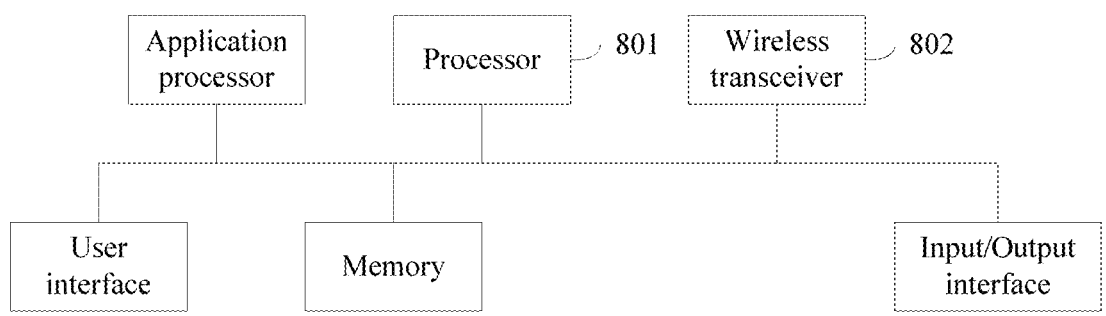
FIG. 8 is a schematic structural diagram 2 of a network device according to an embodiment of this application.

FIG. 8 shows another implementation of the network device. The network device includes: a processor 801, an application processor, a memory, a user interface, an input/output interface, a wireless transceiver 802, and some other components (including devices, such as a power supply, not shown in the figure). In FIG. 8, the processor 801 implements a function of the foregoing processing module 701, and the wireless transceiver 802 implements a function of the foregoing sending module 702. It may be understood that components shown in the figure are merely used as an example, and are not components that are necessary for implementation of this embodiment, for example, the input/output interface may be integrated into a circuit instead of existing in a form of an independent component.

Figure 9:
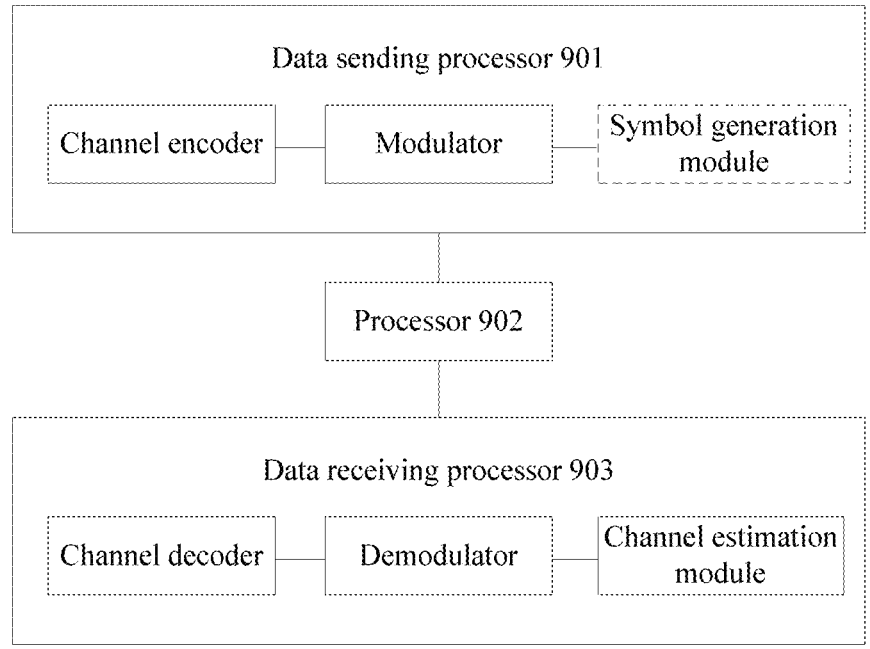
FIG. 9 is a schematic structural diagram 3 of a network device according to an embodiment of this application.

FIG. 9 shows another implementation of the network device. The network device includes a data sending processor 901, a processor 902, and a data receiving processor 903. In FIG. 9, the data sending processor 901 implements a function of the foregoing sending module 702, and the processor 902 implements a function of the foregoing processing module 701. Although FIG. 9 shows a channel encoder and a channel decoder, it may be understood that these modules do not constitute a limitative description of this embodiment and are merely used as an example.

Figure 10:
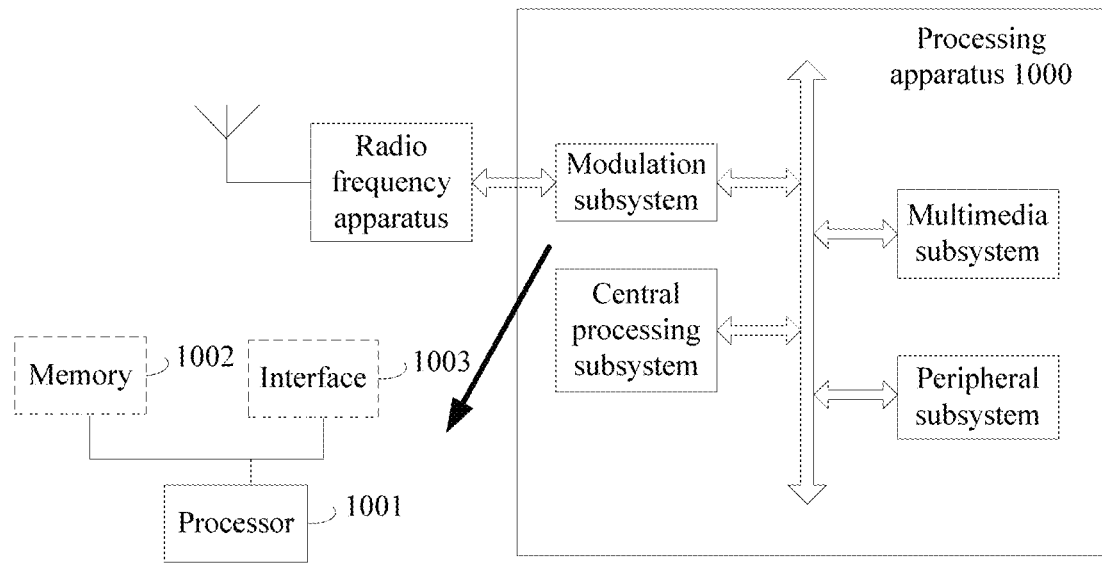
FIG. 10 is a schematic structural diagram 4 of a network device according to an embodiment of this application.

FIG. 10 shows another implementation of the network device. A processing apparatus 1000 includes modules such as a modulation subsystem, a central processing subsystem, and a peripheral subsystem. The network device in this embodiment may be used as the modulation subsystem thereof. Specifically, the modulation subsystem may include a processor 1001 and an interface 1003. The processor 1001 implements a function of the foregoing processing module 701, and the interface 1003 implements a function of the foregoing sending module 702. As a variant, the modulation subsystem includes a memory 1002, a processor 1001, and a program that is stored in the memory and that can run on the processor. When the processor executes the program, the information transmission method is implemented. It should be noted that the memory 1002 may be non-volatile or volatile, and may be located in the modulation subsystem or located in the processing apparatus 1000, provided that the memory 1002 can be connected to the processor 1001.

Because the network device provided in this embodiment can perform the foregoing information transmission method, for a technical effect that can be achieved thereof, reference may be made to the foregoing method embodiment. Details are not described herein again.

An embodiment of this application further provides a computer-readable storage medium, and the computer-readable storage medium stores an instruction. When the computer-readable storage medium runs on a network device, the network device is enabled to perform the information transmission methods shown in FIG. 5 and FIG. 6 in the embodiments of this application.

Optionally, an embodiment of this application provides a chip system, and the chip system includes a processor, configured to support a network device in implementing the information transmission methods shown in FIG. 5 and FIG. 6. In a possible design, the chip system further includes a memory. The memory is configured to store a program instruction and data that are necessary for the network device. Certainly, the memory may not be in the chip system. The chip system may include a chip, or may include a chip and another discrete device. This is not specifically limited in this embodiment of this application.

Figure 11:
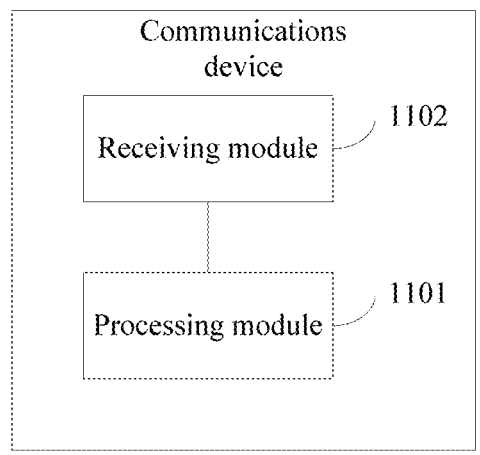
FIG. 11 is a schematic structural diagram 1 of a communications device according to an embodiment of this application.

For example, when function modules are divided based on the functions, FIG. 11 is a possible schematic structural diagram of the communications device in the foregoing embodiments. As shown in FIG. 11, the communications device includes a processing module 1101 and a receiving module 1102. The processing module 1101 is configured to support the communications device in performing steps S103 and S104 in FIG. 5, steps S204 to S206 in FIG. 6, and/or other processes of technologies described in this specification. The receiving module 1102 is configured to support the communications device in performing step S105 in FIG. 5, step S207 in FIG. 6, and/or other processes of technologies described in this specification.

In this embodiment of this application, the apparatus is presented by division of the function modules based on the functions, or the apparatus is presented by division of the function modules in an integrated manner. The "module" herein may include an application-specific integrated circuit (ASIC), a circuit, a processor and memory for executing one or more software or firmware programs, an integrated logic circuit, or another device capable of providing the foregoing functions. In a simple embodiment, a person skilled in the art may figure out that the communications device may be implemented by using the communications device shown in FIG. 4. For example, the receiving module 1102 in FIG. 11 may be implemented by a communications interface 303 in FIG. 4, and the processing module 1101 may be implemented by the processor 301 in FIG. 4. This is not limited in this embodiment of this application.

Figure 12:
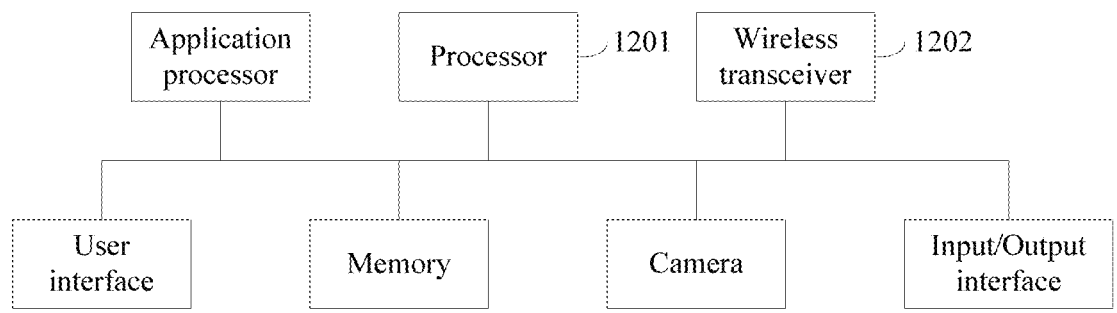
FIG. 12 is a schematic structural diagram 2 of a communications device according to an embodiment of this application.

FIG. 12 shows another implementation of the communications device. The communications device includes: a processor 1201, an application processor, a memory, a user interface, a camera, an input/output interface, a wireless transceiver 1202, and some other components (including devices, such as a power supply, not shown in the figure). In FIG. 12, the processor 1201 implements a function of the foregoing processing module 1101, and the wireless transceiver 1202 implements a function of the foregoing receiving module 1102. It may be understood that components shown in the figure are merely used as an example, and are not components that are necessary for implementation of this embodiment, for example, the camera may be omitted, and the input/output interface may be integrated into a circuit instead of existing in a form of an independent component.

Figure 13:
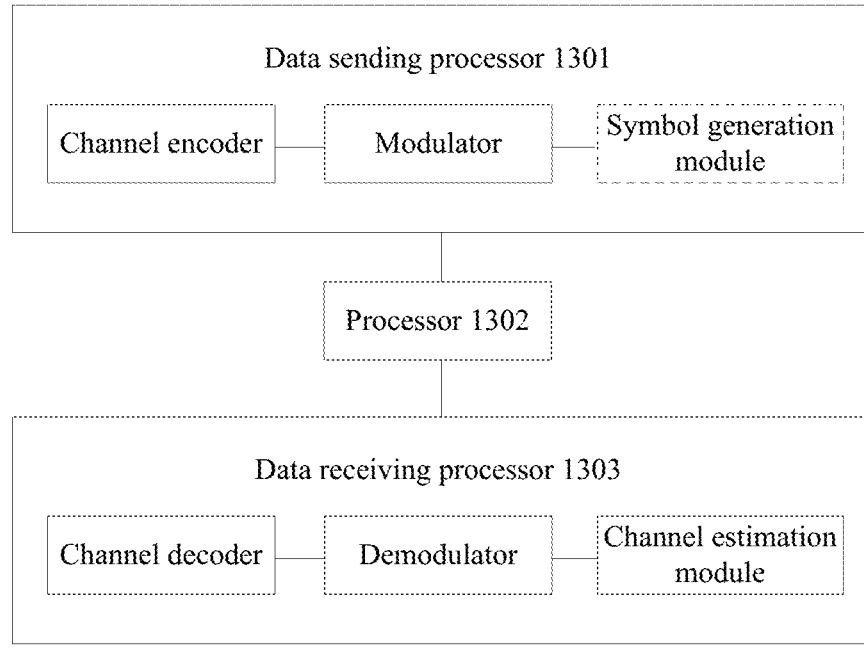
FIG. 13 is a schematic structural diagram 3 of a communications device according to an embodiment of this application.

FIG. 13 shows another implementation of the communications device. The communications device includes a data sending processor 1301, a processor 1302, and a data receiving processor 1303. In FIG. 13, the processor 1302 implements a function of the foregoing processing module 1101, and the data receiving processor 1303 implements a function of the foregoing receiving module 1102. Although FIG. 13 shows a channel encoder and a channel decoder, it may be understood that these modules do not constitute a limitative description of this embodiment and are merely used as an example.

Figure 14:
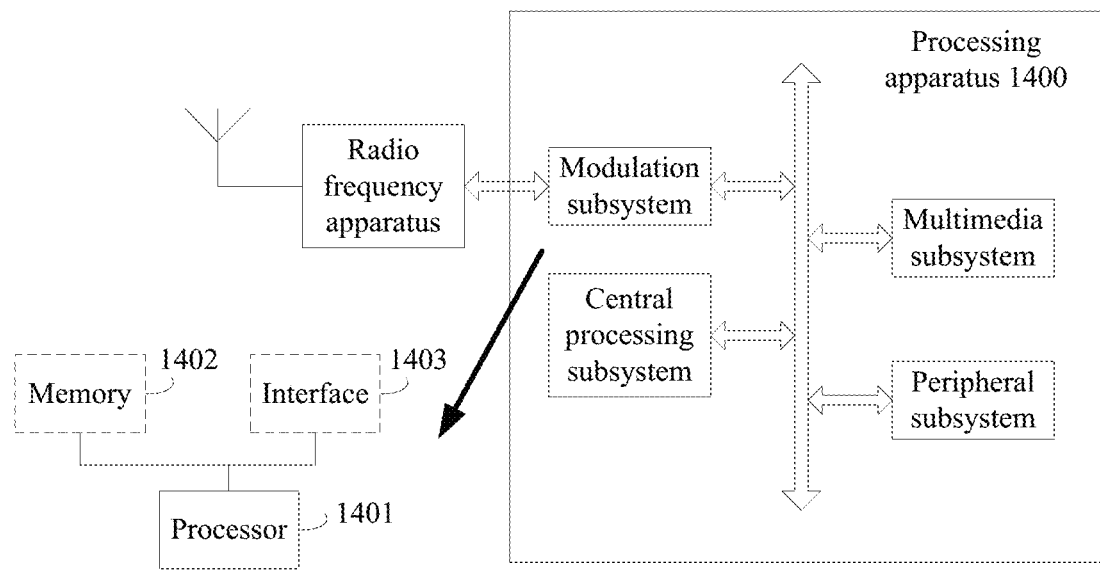
FIG. 14 is a schematic structural diagram 4 of a communications device according to an embodiment of this application.

FIG. 14 shows another implementation of the communications device. A processing apparatus 1400 includes modules such as a modulation subsystem, a central processing subsystem, and a peripheral subsystem. The communications device in this embodiment may be used as the modulation subsystem thereof. Specifically, the modulation subsystem may include a processor 1401 and an interface 1403. The processor 1401 implements a function of the foregoing processing module 1101, and the interface 1403 implements a function of the foregoing receiving module 1102. As another variant, the modulation subsystem includes a memory 1402, a processor 1401, and a program that is stored in the memory and that can run on the processor. When the processor executes the program, the information transmission method is implemented. It should be noted that the memory 1402 may be non-volatile or volatile, and may be located in the modulation subsystem or located in the processing apparatus 1400, provided that the memory 1402 can be connected to the processor 1401.

Because the communications device provided in this embodiment can perform the foregoing information transmission method, for a technical effect that can be achieved thereof, reference may be made to the foregoing method embodiment. Details are not described herein again.

An embodiment of this application further provides a computer-readable storage medium, and the computer-readable storage medium stores an instruction. When the computer-readable storage medium runs on a communications device, the communications device is enabled to perform the information transmission methods shown in FIG. 5 and FIG. 6 in the embodiments of this application.

Optionally, an embodiment of this application provides a chip system, and the chip system includes a processor, configured to support the communications device in implementing the methods shown in FIG. 5 and FIG. 6. In a possible design, the chip system further includes a memory. The memory is configured to store a program instruction and data that are necessary for the communications device. Certainly, the memory may not be in the chip system. The chip system may include a chip, or may include a chip and another discrete device. This is not specifically limited in this embodiment of this application.

All or some of the foregoing embodiments may be implemented by means of software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, this specification and the accompanying drawings are merely example description of this application defined by the appended claims, and are considered as any or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims of this application and their equivalent technologies.

What is claimed is:

1. A method, applied to a network device, the method comprising:
   determining a paging occasion corresponding to a communications device, wherein the paging occasion comprises M monitoring occasions, the M monitoring occasions do not conflict with an uplink symbol, and M represents a total quantity of transmitted beams from a network device;
   determining, based on first information about a beam and a correspondence between at least one piece of information about at least one beam and at least one monitoring occasion, a monitoring occasion corresponding to the beam in the M monitoring occasions; and
   sending downlink control information in the monitoring occasion corresponding to the beam.

2. The method according to claim 1, wherein the first information about the beam comprises an index of the beam, and the index of the beam is an index of a synchronization signal block (SSB).

3. The method according to claim 1, wherein all symbols in the M monitoring occasions are flexible symbols or downlink symbols.

4. The method according to claim 1, wherein the correspondence between the at least one piece of information about at least one beam and the at least one monitoring occasion is a one-to-one correspondence between the M monitoring occasions and M transmitted beams.

5. The method according to claim 1, wherein the downlink control information indicates time-frequency information of physical downlink shared channel (PDSCH) for carrying paging information.

6. The method according to claim 1, wherein the M monitoring occasions do not conflict with any uplink symbol configured by the network device for the communications device.

7. A method, applied to a communication device, the method comprising:
   determining a paging occasion, wherein the paging occasion comprises M monitoring occasions, the M monitoring occasions do not conflict with an uplink symbol, and M represents a total quantity of transmitted beams from a network device;
   determining a target monitoring occasion in the M monitoring occasions based on information about a target beam and a correspondence between at least one piece of information about at least one beam and at least one monitoring occasion, wherein the target monitoring occasion corresponds to the target beam in the correspondence; and
   monitoring for downlink control information in the target monitoring occasion.

8. The method according to claim 7, wherein the information about the target beam comprises an index of the target beam, and the index of the target beam is an index of a synchronization signal block (SSB).

9. The method according to claim 7, further comprising:
   determining information about the target beam, wherein a signal strength of the target beam is ranked higher than a preset rank, or the signal strength of the target beam is greater than a preset value.

10. The method according to claim 7, wherein all symbols in the M monitoring occasions are flexible symbols or downlink symbols.

11. The method according to claim 7, wherein the correspondence between the at least one piece of information about at least one beam and at least one monitoring occasion is a one-to-one correspondence between the M monitoring occasions and M transmitted beams.

12. The method according to claim 7, wherein the downlink control information indicates time-frequency information of physical downlink shared channel (PDSCH) for carrying paging information.

13. The method according to claim 7, wherein the M monitoring occasions do not conflict with any uplink symbol configured by the network device for the communications device.

14. An apparatus, comprising:
   a processor and a non-transitory memory, wherein the memory stores at least one execution instruction, and when the processor executes the at least one execution instruction the apparatus is caused to:
  determine a paging occasion corresponding to a communications device, wherein the paging occasion comprises M monitoring occasions, the M monitoring occasions do not conflict with an uplink symbol, and M represents a total quantity of transmitted beams from the apparatus;
  determine, based on first information about a beam and a correspondence between at least one piece of information about at least one beam and at least one monitoring occasion, a monitoring occasion corresponding to the beam in the M monitoring occasions; and
  send downlink control information in the monitoring occasion corresponding to the beam.

15. The apparatus according to claim 14, wherein the first information about the beam comprises an index of the beam, and the index of the beam is an index of a synchronization signal block (SSB).

16. The apparatus according to claim 14, wherein all symbols in the M monitoring occasion are flexible symbols or downlink symbols.

17. The apparatus according to claim 14, wherein the correspondence between the at least one piece of information about at least one beam and the at least one monitoring occasion is a one-to-one correspondence between the M monitoring occasions and M transmitted beams.

18. The apparatus according to claim 14, wherein the downlink control information indicates time-frequency information of physical downlink shared channel (PDSCH) for carrying paging information.

19. The apparatus according to claim 14, wherein the M monitoring occasions do not conflict with any uplink symbol configured by the apparatus for the communications device.

20. An apparatus, comprising:
  a processor and
  a non-transitory memory, wherein the memory stores at least one execution instruction, and when the processor executes the at least one execution instruction the apparatus is caused to:
    determine a paging occasion, wherein the paging occasion comprises M monitoring occasions, the M monitoring occasions do not conflict with an uplink symbol, and M represents a total quantity of transmitted beams from a network device;
    determine a target monitoring occasion in the M monitoring occasions based on information about a target beam and a correspondence between at least one piece of information about at least one beam and at least one monitoring occasion, wherein the target monitoring occasion corresponds to the target beam in the correspondence; and
    monitor for downlink control information in the target monitoring occasion.

21. The apparatus according to claim 20, wherein the information about the target beam comprises an index of the target beam, and the index of the target beam is an index of a synchronization signal block (SSB).

22. The apparatus according to claim 20, wherein the processor executes the at least one execution instruction to further cause the apparatus to:
  determine information about the target beam, wherein a signal strength of the target beam is ranked higher than a preset rank, or the signal strength of the target beam is greater than a preset value.

23. The apparatus according to claim 20, wherein all symbols in the M monitoring occasions are flexible symbols or downlink symbols.

24. The apparatus according to claim 20, wherein the correspondence between the at least one piece of information about at least one beam and at least one monitoring occasion is a one-to-one correspondence between the M monitoring occasions and M transmitted beams.

25. The apparatus according to claim 20, wherein the downlink control information indicates time-frequency information of physical downlink shared channel (PDSCH) for carrying paging information.

26. The apparatus according to claim 20, wherein the M monitoring occasions do not conflict with any uplink symbol configured by the network device for the apparatus.

* * * * *

UNITED STATES PATENT AND TRADEMARK OFFICE
CERTIFICATE OF CORRECTION

| | | |
|---|---|---|
| PATENT NO. | : 11,871,377 B2 | Page 1 of 1 |
| APPLICATION NO. | : 17/453947 | |
| DATED | : January 9, 2024 | |
| INVENTOR(S) | : Chen et al. | |

It is certified that error appears in the above-identified patent and that said Letters Patent is hereby corrected as shown below:

In the Specification

In Column 7, Line 29, delete "is" and insert -- i_s --.

In Column 9, Line 34, delete "is" and insert -- i_s --.

Signed and Sealed this
Second Day of April, 2024

Katherine Kelly Vidal
*Director of the United States Patent and Trademark Office*